United States Patent
Jebara

(10) Patent No.: US 10,296,761 B2
(45) Date of Patent: May 21, 2019

(54) DATABASE PRIVACY PROTECTION DEVICES, METHODS, AND SYSTEMS

(71) Applicant: The Trustees of Columbia University in the City of New York, New York, NY (US)

(72) Inventor: Tony Jebara, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 369 days.

(21) Appl. No.: 15/038,400

(22) PCT Filed: Nov. 21, 2014

(86) PCT No.: PCT/US2014/066783
§ 371 (c)(1),
(2) Date: May 20, 2016

(87) PCT Pub. No.: WO2015/077542
PCT Pub. Date: May 28, 2015

(65) Prior Publication Data
US 2016/0292455 A1 Oct. 6, 2016

Related U.S. Application Data

(60) Provisional application No. 61/908,368, filed on Nov. 25, 2013, provisional application No. 61/907,870, filed on Nov. 22, 2013.

(51) Int. Cl.
*G06F 7/02* (2006.01)
*G06F 17/30* (2006.01)
(Continued)

(52) U.S. Cl.
CPC ...... *G06F 21/6245* (2013.01); *G06F 16/9535* (2019.01); *G06F 21/6254* (2013.01)

(58) Field of Classification Search
CPC .......... G06F 17/30867; G06F 21/6254; G06F 9/30036; G06F 21/6245; G06F 16/9535; G06F 16/9536; G06F 16/9538
See application file for complete search history.

(56) References Cited

U.S. PATENT DOCUMENTS 8,140,502 B2   3/2012  Francis et al.
8,346,774 B1 * 1/2013  Kanevsky ......... G06F 17/30501
                                                           707/600

(Continued)

OTHER PUBLICATIONS

El-Emam, Khaled et al, "Protecting Privacy Using K-Anonymity," Journal of the Medical Informatics Association, Sep.-Oct. 2008. (Year: 2008).*

(Continued)

*Primary Examiner* — Bruce M Moser
(74) *Attorney, Agent, or Firm* — Potomac Law Group PLLC; Mark Catan

(57) ABSTRACT

A system for reducing the information content of a data stream according to privacy requirements that vary according to referents of the data while maximizing the utility of the data stream in the aggregate. In embodiments, a receiver of data characterizing multiple referents extracts information such as statistics. A filter may reduce the information content of the data to reduce the probability that the receiver could uniquely identify any single referent from the data, according to privacy requirements that vary by the referent. The filter allows this to be done in a way that allows the utility of the data to be maximized when the permitted probability of identification varies among the referents.

17 Claims, 8 Drawing Sheets

(51) Int. Cl.
G06F 21/62 (2013.01)
G06F 16/9535 (2019.01)

(56) References Cited

U.S. PATENT DOCUMENTS

| | | | |
|---|---|---|---|
| 8,483,125 B2 | 7/2013 | Legg | |
| 2002/0169793 A1 | 11/2002 | Sweeney | |
| 2012/0130794 A1 | 5/2012 | Strieder | |
| 2014/0365512 A1* | 12/2014 | Thomson | G06F 17/30699 707/754 |
| 2016/0300075 A1* | 10/2016 | Stankiewicz | G06F 21/6245 |

OTHER PUBLICATIONS

Ei-Ennann, Khaled et al, "Protecting Privacy Using K-Anonymity," Journal of the Medical Informatics Association, Sep.-Oct. 2008 (Year: 2008).*
Sweeney, Latanya, "Achieving k-Anonymity Privacy Protection Usin Generalization and Suppression," International Journal on Uncertainty, Fuzziness and Knowledge-based Systems, 2002 (Year: 2002).*
Aggarwal et al., "Approximation Algorithms for k-Anonymity", Journal of Privacy Technology, Nov. 20, 2005, 18 pages.
Allman et al., "Issues and Etiquette Concerning Use of Shared Measurement Data", IMC '07 Proceedings of the 7th ACM SIGCOMM conference on Internet measurement held Oct. 24-26, 2007, pp. 135-140.
Beach et al., "Social-K: Real-Time K-Anonymity Guarantees for Social Network Applications," Pervasive Computing and Communications Workshops (PERCOM Workshops), 2010 8th IEEE International Conference on Mar. 29, 2010-Apr. 2, 2010, pp. 600-606.
Bhagat et al., "Class-based graph anonymization for social network data", Journal Proceedings of the VLDB Endowment VLDB Endowment Aug. 1, 2009, vol. 2(1), pp. 766-777.
Chaudhuri et al., "Differentially Private Empirical Risk Minimization", Journal of Machine Learning Research, Mar. 1, 2011, vol. 12, pp. 1069-1109.
Cormode et al., "Anonymizing bipartite graph data using safe groupings", The VLDB Journal, Sep. 25, 2009, vol. 19(1), pp. 115-139.
Duan et al., "Approximating maximum weight matching in near-linear time", In proceedings 51st IEEE Symposium on Foundations of Computer Science (FOCS), Oct. 23, 2010 through Oct. 26, 2010, pp. 673-682.
Dwork, "Differential Privacy", 33rd International Colloquium, ICALP 2006: Automata, Languages and Programming, Part of the Lecture Notes in Computer Science book series (LNCS, vol. 4052), Jul. 10-14, 2006, pp. 1-12.
Edmonds, "Paths, Trees, and Flowers", Canadian Journal of Mathematics, Jan. 1, 1965, vol. 17, pp. 449-467.
Gabow, "An efficient reduction technique for degree-constrained subgraph and bidirected network flow problems", ProceedingSTOC 1983 Proceedings of the 15th annual ACM symposium on Theory of computing, Apr. 25-27, 1983, pp. 448-456.
Gionis et al., "k-Anonymization Revisited", Data Engineering, ICDE 2008 IEEE 24th International Conference on Apr. 7-12, 2008 (10 pp. total).

Huang et al., Fast b-matching via sufficient selection belief propagation. In Proceedings of the Fourteenth International Conference on Artificial Intelligence and Statistics, Jan. 2011, PMLR 15, pp. 361-369.
International Preliminary Report of Patentability for International Application No. PCT/US2014/066783 dated May 24, 2016.
International Search Report and Written Opinion for International Application No. PCT/US2014/066783 dated Apr. 8, 2015.
Jordan et al., "An Introduction to Variational Methods for Graphical Models", Machine Learning, Nov. 1, 1999, vol. 37(2), pp. 183-233.
Kolmogorov, "Blossom V: a new implementation of a minimum cost perfect matching algorithm", Mathematical Programming Computation, Apr. 21, 2009, vol. 1(1), pp. 43-67.
Li et al., "t-Closeness: Privacy Beyond k-Anonymity and I-Diversity", Data Engineering, 2007. ICDE 2007. IEEE 23rd International Conference on Apr. 15-20, 2007.
Lodha et al., "Probabilistic Anonymity", Privacy, Security, and Trust in KDD First ACM SIGKDD International Workshop, PinKDD 2007, San Jose, CA, USA, Aug. 12, 2007 (12 pp. total).
Machanavajjhala et al., "L-Diversity: Privacy beyond k-anonymity", ACM Transactions on Knowledge Discovery from Data (TKDD), Mar. 1, 2007. vol. 1(1), Article No. 3, 52 pages.
Meyerson et al., "On the Complexity of Optimal K-Anonymity", PODS 2004 Proceedings of the 23rd ACM SIGMOD-SIGACT-SIGART symposium on Principles of database systems, Jun. 14-16, 2004, pp. 223-228.
Samarati et al., "Generalizing Data to Provide Anonymity when Disclosing Information", Proceeding PODS 1998 Proceedings of the 17th ACM SIGACT-SIGMOD-SIGART symposium on Principles of database systems, Jun. 1-4, 1998, 15 pages.
Sweeney, "Achieving k-anonymity privacy protection using generalization and suppression", International Journal on Uncertainty, Fuzziness and Knowledge-based Systems, Oct. 1, 2001, vol. 10(5), pp. 571-588.
Sweeney, "Guaranteeing anonymity when sharing medical data, the Datafly System", Proc AMIA Annu Fall Symp., Oct. 25-27, 1997, pp. 51-55.
Tao et al., "Personalized Privacy Preservation", Privacy-Preserving Data Mining Advances in Database Systems, vol. 34, Chapter 19, Springer, Boston, MA, pp. 461-485.
Williams et al., "Probabilistic Inference and Differential Privacy", NIPS 2010 Proceedings of the 23rd International Conference on Neural Information Processing Systems, Dec. 6-9, 2010, vol. 2, pp. 2451-2459.
Xi et al., "Probabilistic Adaptive Anonymous Authentication in Vehicular Networks", Journal of Computer Science and Technology, Nov. 23, 2008, vol. 23(6) pp. 916-928.
Xiao et al., "Personalized Privacy Preservation", SIGMOD 2006 Proceedings of the 2006 ACM SIGMOD international conference on Management of Data, Jun. 27-29, 2006, pp. 229-240.
Xue et al., "Anonymizing set-valued data by nonreciprocal recoding", KDD—18th ACM SIGKDD International Conference on Knowledge Discovery and Data Mining, Aug. 12-16, 2012, pp. 1050-1058.
Zheleva et al., "Preserving the Privacy of Sensitive Relationships in Graph Data",1st ACM SIGKDD International Workshop, PinKDD 2007, Aug. 12, 2007, 20 pages.

* cited by examiner

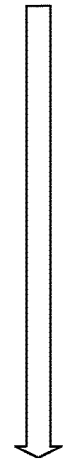
Fig. 7A
Fig. 7B

| name | age | 0-25 yo | 26-50 yo | 51+ yo | minor/adult |
|---|---|---|---|---|---|
| bob | 38 | 0 | 1 | 0 | 1 |
| alice | 20 | 1 | 0 | 0 | 0 |
| carol | 12 | 1 | 0 | 0 | 0 |
| dave | 56 | 0 | 0 | 1 | 1 |
| eve | 46 | 0 | 1 | 0 | 1 |
| fred | 72 | 0 | 0 | 1 | 1 |

722

| name | age | 0-25 yo | 26-50 yo | 51+ yo | minor/adult |
|---|---|---|---|---|---|
| bob | 38 | 0 | 1 | 0 | 1 |
| alice | * | 1 | 0 | 0 | 0 |
| carol | 12 | 1 | 0 | 0 | 0 |
| dave | * | 0 | 0 | 1 | 1 |
| eve | 46 | 0 | 1 | 0 | 1 |
| fred | * | * | * | * | 1 |

724

DATABASE PRIVACY PROTECTION DEVICES, METHODS, AND SYSTEMS

CROSS-REFERENCE TO RELATED APPLICATIONS

This application is a U.S. national stage filing under 35 U.S.C. § 371 of International Application No. PCT/US2014/066783, filed Nov. 21, 2014, the content of which is hereby incorporated by reference in its entirety, which claims the benefit of U.S. Provisional Application No. 61/907,870, filed Nov. 22, 2013, the content of which is hereby incorporated by reference in its entirety, and also claims the benefit of U.S. Provisional Application No. 61/908,368, filed Nov. 25, 2013, the content of which is hereby incorporated by reference in its entirety.

BACKGROUND

The ubiquity of data-sharing in databases such as social networks raises privacy concerns for participants. Simply hiding the identities of individuals prior to making the data publicly available cannot guarantee privacy, or at least anonymity, because the richness and quantity of data can allow individual identities to be estimated. The data includes not only properties of individuals but their connections to each other which is often also included in such databases.

In many situations, individuals wish to share their personal data for a variety of reasons, including social networking or for machine learning applications such as recommenders and exploration purposes. If the data contains tacitly identifying information, it can be necessary to protect it with privacy or at least anonymity guarantees while maintaining forms of utility of the data (i.e., ability to utilize data for a desired function). Privacy can be guaranteed by hiding or generalizing data. There are various schemes that have been studied and which are used. These include k-anonymity, l-diversity, t-closeness, and differential privacy, where differential privacy over requires specifying the data application (e.g., logistic regression) in advance.

SUMMARY

K-anonymity and similar concepts of privacy guarantees treat the privacy requirements of all subjects of contributed data equally. In fact, they treat each contributed datum about an individual equally. However, the acceptable anonymity and comfort level of each individual in a population can vary. In other words, individuals can have very different tolerances with respect to how much data they are willing to share. Some individuals can be highly risk averse or simply worried and would share nothing, while other individuals will share some data about themselves as long as they have some small amount of anonymity or privacy.

Embodiments of the disclosed subject matter relate generally to methods, apparatuses, systems, computer programs, computer readable media, and devices that can provide adaptive anonymity. Users can provide a system with individual input data sets that include user-specific data. Users can further provide an anonymity parameter (e.g., an integer value) that indicates a desired anonymity level for each user, where the desired anonymity level can be variable (i.e., can differ for each user). The system can compile the individual input data sets into an overall input data set, calculate a minimum number of data values that are required to be suppressed (e.g., masked or hidden) to provide the desired anonymity levels for the users, calculate a compatibility graph that connects the input data set and an output data set based on weighted values, and generate the output data set, where the output data set includes the data values from the input data set, and where the calculated minimum number of data values are suppressed. The system can then store the output data set within a database or some other type of data storage. By suppressing certain data values of the output data set, the system can provide the desired anonymity level to each user. Further, by minimizing a number of data values that are suppressed within the output data set, the system can maximize the utility of the output data set.

BRIEF DESCRIPTION OF THE DRAWINGS

Embodiments will herein be described in detail below with reference to the accompanying drawings, wherein like reference numerals represent like elements. The accompanying drawings have not necessarily been drawn to scale. Where applicable, some features may not be illustrated to assist in the description of underlying features.

FIGS. 7A, 7B, and 7C illustrate generalization as opposed to binary masking and unmasking in creating an anonymization scheme for released data or in which the anonymization scheme may generalize as well as or alternative to full masking of elements, according to embodiments of the disclosed subject matter.

DETAILED DESCRIPTION

Figure 1:
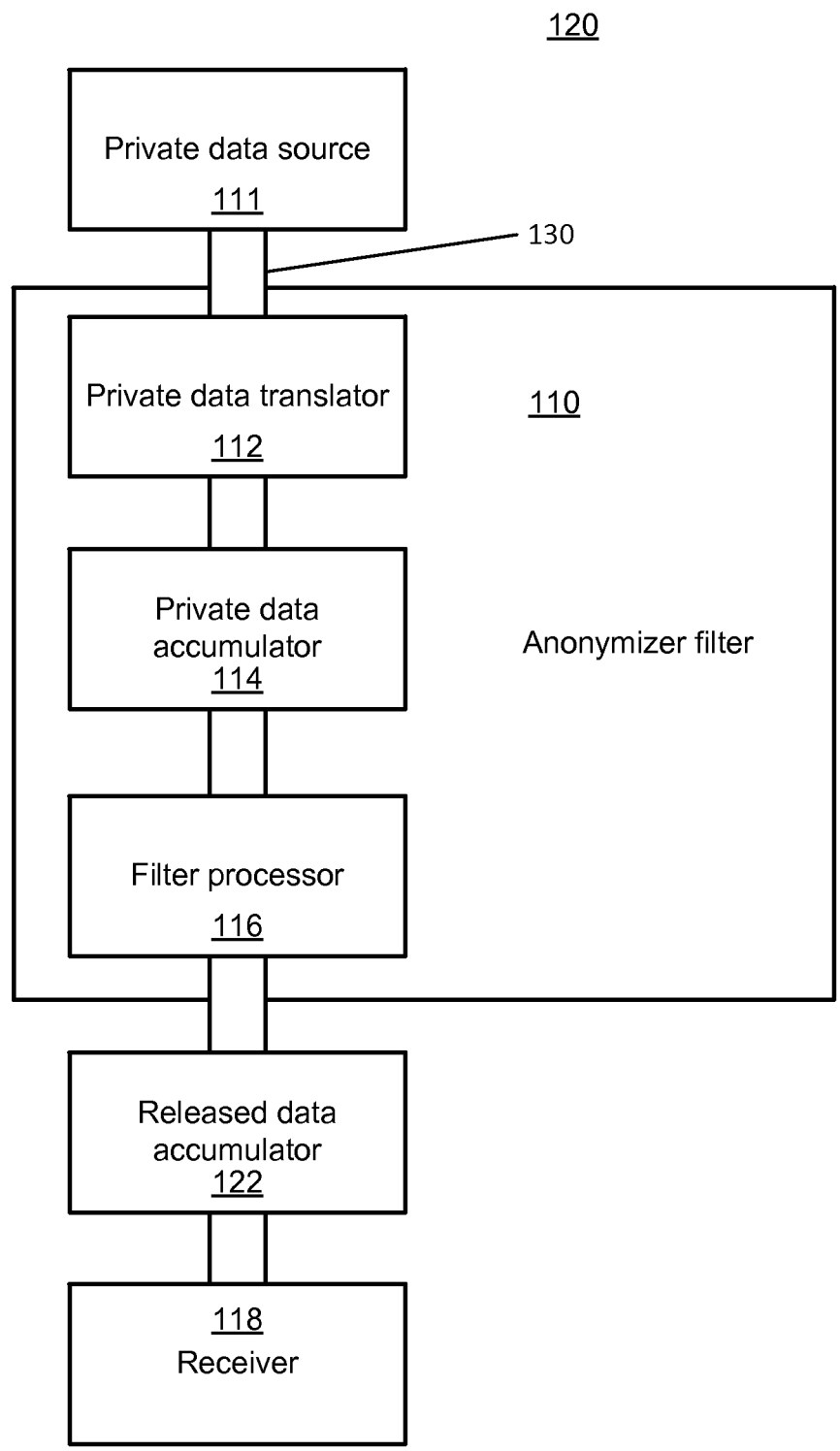
FIG. 1 illustrates a communication channel with a filter that anonymizes data transmitted through the channel to a recipient, according to embodiments of the disclosed subject matter.

Embodiments relate to a computer-implemented method, apparatus, system, computer-readable medium, and computer program product for providing adaptive anonymity. The embodiments include methods, apparatuses, systems, computer-readable media, and computer program products for providing adaptive anonymity via b-matching.

As previously described, individuals wish to share their personal data for machine learning applications and other exploration purposes. If the data contains sensitive information, it can be necessary to protect it with privacy guarantees while maintaining data utility. By data utility, we mean that the data can reveal useful information about the user or cohorts containing the user without revealing sufficient information that might be considered to undermine the user's interest in privacy.

The disclosed subject matter addresses this balance between the need for privacy and the benefit of disclosing information about a user in recognition of the fact that the acceptable amount of privacy to be traded, or acceptable anonymity of each individual may vary. The term anonymity as used herein is a quantification of the concept of privacy captured in the statistical notion of ambiguity or the probability that any single referent characterized by data in a database could be uniquely identified by the characterizing data. Thus, it may be that some referents, typically, but not necessarily individuals, require a higher degree of anonymity than others. For an example of a non-person referent, think of a database that describes real estate. The features of houses may be presented to a recommender engine or a searcher while revealing more or less information according to privacy requirements corresponding to the subject referent property. A highly anonymous referent would be indistinguishable from a larger number of other referents, in the presented (or the accessible data) than a referent with lower anonymity. The presented data or accessible data we refer to as the released data or if in the form of a database, the released database.

Note that in all instances or embodiments where a user or person is discussed, it is intended that the disclosed subject matter include variants in which other referents apply. That is, the disclosed subject matter applies equally to other referents that individual users or persons. Such referents can be pets, inanimate objects, properties, etc.

An adaptive anonymity problem considers a data-set $X \in Z^{n \times d}$ comprising $n \in N$ observations $\{x_1, \ldots, x_n\}$ each of which is a d-dimensional discrete vector, in other words, $x_i \in Z^d$. Each user, i, contributes an observation vector, $x_i$, which contains discrete attributes, or data values, pertaining to that user. For example, a vector can contain a user's gender, race, height, weight, age, income bracket, etc. Furthermore, each user, i, provides an adaptive anonymity parameter $\delta_i \in N$ they desire to keep when the database is released. Given such a data-set and anonymity parameters, according to embodiments of the disclosed subject matter, a computer-implemented method, apparatus, system, computer-readable medium, and computer program product can output an obfuscated data-set denoted by $Y \in \{Z \cup *\}^{n \times d}$ which comprises vectors $\{y_1, \ldots, y_n\}$ where $y_i(k) \in \{x_1(k), *\}$. The star symbol * indicates that the k'th attribute has been masked in the i'th user-record. Vector $x_i$ is compatible with vector $y_j$ if $x_i(k) = y_j(k)$ for all elements of $y_j(k) \neq *$. The computer-implemented method, apparatus, system, computer-readable medium, and computer program product can create a Y that contains a minimal number of * symbols such that each entry $y_i$ of Y is compatible with at least $\delta_i$ entries of X and vice-versa.

A method for anonymity in the released data is the k-anonymity method. However, it can actually be more constraining than the above desiderata. If all users have the same value $\delta_i = k$, then k-anonymity suppresses data in the database such that, for each user's data vector in the released (or anonymized) database, there are at least k−1 identical copies in the released database. The existence of copies is used by k-anonymity to justify some protection to attack.

Further, the k-anonymity method has difficulties handling heterogeneous anonymity levels $\delta_i$. For example, consider the case where the population contains many liberal users with very low anonymity levels yet one single paranoid user (user i) wants to have a maximal anonymity with $\delta_i = n$. In the k-anonymity framework, that user will require n−1 identical copies of his data in the released database. Thus, a single paranoid user will destroy all the information of the database which will merely contain completely redundant vectors.

According to certain embodiments, a computer-implemented method, apparatus, system, computer-readable medium, and computer program product can provide a b-matching relaxation to k-anonymity that can prevent this degeneracy since it does not merely handle compatibility queries by creating copies in the released data. This can lead a generalization of k-anonymity to the b-matching setting, where the computer-implemented method, apparatus, system, computer-readable medium, and computer program product can implement this type of anonymity. The relaxation can achieve better utility, allow for privacy guarantees that are strong, and, most importantly, accommodate a variable level of anonymity for each individual user. Thus, the computer-implemented method, apparatus, system, computer-readable medium, and computer program product can store and retrieve data that represents relationships in a way that ensures privacy directives that can vary with the released data.

According to certain embodiments, a computer-implemented method, apparatus, system, computer-readable medium, and computer program product can be provided that forms a compatibility graph between the original database and the released database which is composed of several fully-connected k-cliques in order to represent k−1 copies. However, rather than guaranteeing copies or cliques, the method can relax the anonymity problem into a k-regular compatibility to achieve nearly identical resilience to attack. More interestingly, this relaxation can naturally allow users to select different $\delta_i$ anonymity values or degrees in the compatibility graph and allow them to achieve their desired personal protection level.

Furthermore, according to certain embodiments, a computer-implemented method, apparatus, system, computer-readable medium, and computer program product can be provided that implements an algorithm for a b-matching anonymity problem with approximation ratio of $\delta$ and runtime of $O(\delta m \sqrt{n})$ where n is the number of users in the data, $\delta$ is the largest anonymity level in $\{\delta_1, \ldots, \delta_n\}$ and m is the number of edges to explore (in the worst case with no prior knowledge, we have $m = O(n^2)$ edges between all possible users. In one embodiment, the algorithm solves for minimum weight bipartite b-matchings which can be easy to implement using linear programming, max-flow methods or belief propagation in the bipartite case. In another embodiment, the algorithm uses a general non-bipartite solver which involves Blossom structures and requires $O(\delta mn \log n)$ time. Fortunately, minimum weight general matching has recently been shown to require only $O(me^{-1} \log e^{-1})$ time to achieve an (1−e) approximation. Thus, the algorithm can allow the computer-implemented method, apparatus, system, computer-readable medium, and computer program product to solve for minimum weight bipartite b-matchings significantly quicker than a human.

In certain embodiments, the aforementioned functionality is implemented in a computer system that includes a client device and a server device, where the server device communicates with (e.g., transmits data to) the client device using a network device, and whether the client device also communicates with (e.g., transmits data to) the server device using the network device. The computer system can be a general-purpose computer system that includes a computer-readable medium that stores one or more executable instructions that, when executed, program the general-purpose computer system and transform the general-purpose computer system into a special-purpose computer system configured to perform the aforementioned functionality. In these embodiments, a user of a client device can share personal data to the server device using the network device, and the personal data can be suppressed (e.g., masked or hidden) when transmitted to the server device using the network device. In certain embodiments, the computer system includes an anonymizing device in addition to the client device, the service device, and the network device. In these embodiments, the client device can first transmit data to the anonymizing device using the network device. The anonymizing device can suppress (e.g., mask or hide) data that is identified as personal data, and then can transmit the suppressed data to the server device using the network device. Likewise, the server device can transmit data to the anonymizing device using the network device. The anonymizing device can identify a recipient of the data and can transmit the data to the client device using the network device.

Further, in certain embodiments, the aforementioned functionality can have practical applications in a variety of contexts. For example, the algorithm can provide for user-adaptive anonymity in multi-user online environments, such as social networks, and online forums. More specifically, a user of a social network or online forum may be encouraged to provide user-specific data, and potentially sensitive user-specific data. The data may be data relating to referents associated with the user or other referents about which unique identification is a concern, such as a security facility or a unique computer. Such user-specific data may be desired by the administrators of such social networks or online forums, in order to provide such services as product recommendations, matching recommendations, or advertisement recommendations. However, the user may not be willing to provide such user-specific data unless a specified anonymity level is guaranteed. Social networks and online forms that implement the aforementioned adaptive anonymity algorithm can provide adaptive anonymity to the users, and can guarantee the variable anonymity levels specified by each user, while retaining a maximum utility of the user-specific data. Similarly, organizations such as hospitals, universities, and research companies can utilize the aforementioned adaptive anonymity algorithm to protect user-specific data that is provided to them in relation to business, social and clinical studies.

In certain embodiments, the adaptive anonymity algorithm may be distributed in a system among multiple processors communicating over a network such that each can send and receive messages via wired or wireless links. Each node of a compatibility graph can correspond to a respective node processor. Alternatively, each node processor can correspond to multiple nodes of the compatibility graph. In such a case only a portion of one or more weight data values of a weight data set may be provided to each node processor, the portion being sufficient to indicate the weights of the edges that connect the node to any other nodes of the compatibility graph. The node processors can access the respective weight information on common (e.g. central) or distributed data stores (e.g., respective of each node processor or community of node processors). See U.S. Pat. No. 8,631,044 to Jebara, hereby incorporated in its entirety herein, for details of such a system.

While k-anonymity is not the only criterion for privacy, there are situations in which it is sufficient as illustrated by the following scenario. First assume the data-set X is associated with a set of identities (or usernames) and Y is associated with a set of keys. A key may be the user's password or some secret information (such as their DNA sequence). Represent the usernames and keys using integers $x_l$, K, $x_n$ and $y_l$, K, $y_n$, respectively. Username $x_i \in Z$ is associated with entry $x_i$ and key $y_j \in Z$ is associated with entry $y_j$. Furthermore, assume that these usernames and keys are diverse, unique and independent of their corresponding attributes. These x and y values are known as the sensitive attributes and the entries of X and Y are the non-sensitive attributes. An objective is to release an obfuscated database Y and its keys with the possibility that an adversary may have access to all or a subset of X and the identities.

The goal is to ensure that the success of an attack (using a username-key pair) is low. In other words, the attack succeeds with probability no larger than $1/\delta_i$ for a user which specified $\delta_i \in N$. Thus, an attack that the computer-implemented method, apparatus, system, computer-readable medium, and computer program product seeks to protect against is the use of the data to match usernames to keys (rather than attacks in which additional non-sensitive attributes about a user are discovered). In the uniform $\delta_i$ setting, k-anonymity guarantees that a single one-time attack using a single username-key pair succeeds with probability at most $1/k$. In the extreme case, it is easy to see that replacing all of Y with * symbols will result in an attack success probability of $1/n$ if the adversary attempts a single random attack-pair (username and key). Meanwhile, releasing a database Y=X with keys could allow the adversary to succeed with an initial attack with probability 1.

Assume that all degrees $\delta_i$ are constant and set to $\delta$ and discuss how the proposed b-matching privacy output subtly differs from standard k-anonymity. First, define quasi-identifiers as sets of attributes like gender and age that can be linked with external data to uniquely identify an individual in the population. The k-anonymity criterion says that a data-set such as Y is protected against linking attacks that exploit quasi-identifiers if every element is indistinguishable from at least k−1 other elements with respect to every set of quasi-identifier attributes. According to embodiments, the computer-implemented method, apparatus, system, computer-readable medium, and computer program product instead use a compatibility graph G to more precisely characterize how elements are indistinguishable in the data-sets and which entries of Y are compatible with entries in the original data-set X. The graph places edges between entries of X which are compatible with entries of Y. Clearly, G is an undirected bipartite graph containing two equal-sized partitions (or color-classes) of nodes A and B each of cardinality n where A={$a_1$, K, $a_n$} and B={$b_1$K, $b_n$}. Each element of A is associated with an entry of X and each element of B is associated with an entry of Y. An edge e=(i, j)∈G that is adjacent to a node in A and a node in B indicates that the entries $x_i$ and $y_j$ are compatible. The absence of an edge means nothing: entries are either compatible or not compatible.

For $\delta_i=\delta$, b-matching produces δ-regular bipartite graphs G while k-anonymity produces δ-regular clique-bipartite graphs defined below. Traditional k-anonymity releases an obfuscated database of n rows where there are k copies of each row. So, each copy has the same neighborhood. Similarly, the entries of the original database all have to be connected to the same k copies in the obfuscated database. This induces a so-called bipartite clique-connectivity.

Definition 2.1

Let G(A,B) be a bipartite graph with color classes: A, B where A={$a_1$, . . . , $a_n$}, B={$b_1$, . . . $b_n$}. We call a k-regular bipartite graph G(A,B) a clique-bipartite graph if it is a union of pairwise disjoint and nonadjacent complete k-regular bipartite graphs.

Denote by $G_n^{n,\delta}$ the family of δ-regular bipartite graphs with n nodes. Similarly, denote by $G_k^{n,\delta}$ the family of δ-regular graphs clique-bipartite graphs. We will also denote by $G_s^{n,\delta}$ the family of symmetric b-regular graphs using the following definition of symmetry.

Definition 2.2

Let G(A,B) be a bipartite graph with color classes: A, B where A={$a_1, \ldots a_n$}, B={$b_1, \ldots, b_n$}. We say that G(A,B) is symmetric if the existence of an edge ($a_i, b_j$) in G(A,B) implies the existence of an edge ($a_j, b_i$), where 1≤i, j≤n.

For values of n that are not trivially small, it is easy to see that the graph families satisfy $G_k^{n,\delta} \subseteq G_s^{n,\delta} \subseteq G_b^{n,\delta}$. This holds since symmetric δ-regular graphs are δ-regular with the additional symmetry constraint. Clique-bipartite graphs are δ-regular graphs constrained to be clique-bipartite and the latter property automatically yields symmetry.

Graph families $G_b^{n,\delta}$ and $G_s^{n,\delta}$ are introduced to enforce privacy since these are relaxations of the family $G_k^{n,b}$ as previously explored in k-anonymity research. These relaxations will achieve better utility in the released database. Furthermore, they will permit adaptive anonymity levels across the users in the database. The superscripts n and δ will be dropped whenever the meaning is clear from the context. Additional properties of these graph families are further described below in greater detail, but first, it is described how they are useful in achieving data privacy.

FIG. 1 illustrates a communication channel 130 with a filter 110 that anonymizes data transmitted through the channel to one or more receivers, indicated as receiver 118. The communication channel may include wired or wireless channels, servers, switches, and other incidents of a digital communication network or Internet. The private data source 111 may include a network of users and a data maintenance facility for updating the private data. Alternatively, it may be a provider of a single stream or batch of data that is transmitted. An example a private data source 111 is a direct measurement facility such as multiplexer of data streams that received data from sensor transponders. Another example of a private data source 111 is a social media network service server. The private data source 111 transmits private to a private data translator 112 which may modify the content or format of the data. A private data accumulator 114 may be provided as necessary in order for data that is streamed to be accumulated to apply the filter methods described herein. For example, the private data translator 112 together with private data accumulator 114 may generalize certain vector elements of the private data as described with reference to FIG. 7A. See the discussion below. The filter process 116 anonymizes the accumulated data to generate released data which may be accumulated for on-demand transmission by an accumulator at 122.

Figure 2A:
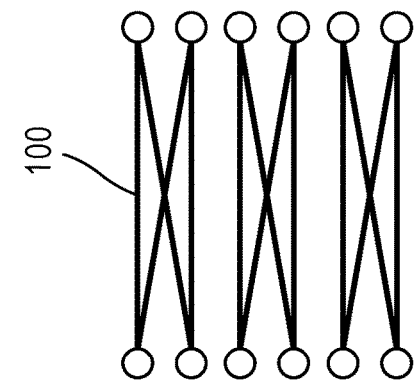
FIG. 2A is an example of a compatibility graph that provides k-anonymity, according to embodiments of the disclosed subject matter.

FIG. 2A figuratively illustrates a simple compatibility graph 100 that provides k-anonymity for a data set 101, according to embodiments of the disclosed subject matter. In FIG. 2A, an example of k-anonymity with a graph from $G_k$ is shown. Here each entry of the anonymized data-set 102 (i.e., anonymized data-set Y) appears k=2 times (or δ=2). The compatibility graph shows 3 fully connected cliques since each of the k copies in Y has identical entries. By brute force exploration we find that the minimum number of stars to achieve this type of anonymity is #(*)=10. Moreover, since this problem is NP-hard, efficient algorithms rarely achieve this best-possible utility (minimal number of stars).

Figure 2B:
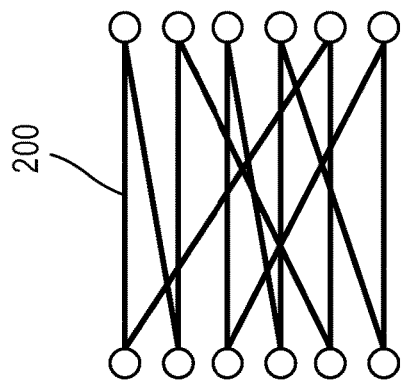
FIG. 2B is an example of a compatibility graph that provides b-matching anonymity, according to embodiments of the disclosed subject matter.
Figure 2B:
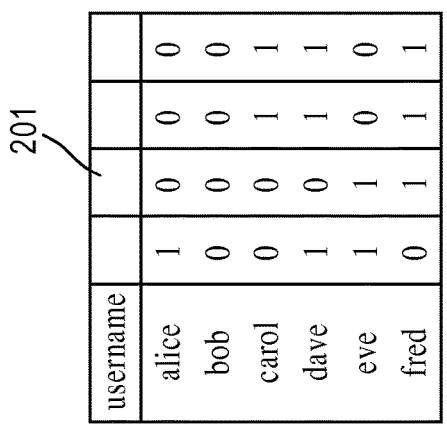

FIG. 2B illustrates a compatibility graph 200 that provides b-matching anonymity for a data set 201, according to embodiments of the disclosed subject matter. In FIG. 2B superior utility has been achieved by only introducing #(*)=8 stars to form anonymized data-set 202 (i.e., anonymized data-set Y). The compatibility graph is at least δ=2-regular. It can be seen that it is possible to find a smaller number of stars since δ-regular bipartite graphs are a relaxation of k-clique graphs as shown in FIG. 2. Another possibility (not shown in the figures) is a symmetric version of FIG. 2 where nodes on the left hand side and nodes on the right hand side have a symmetric connectivity. Such an intermediate solution (since $G_k \subset G_s \subset G_b$) should potentially achieve #(*) between 8 and 10.

It is easy to see why all graphs have to have a minimum degree of δ at least (i.e. must contain a δ-regular graph). If one of the nodes has a degree of 1, then the adversary will know the key (or the username) for that node with certainty. If each node has degree δ or larger, then the adversary will have probability at most 1/δ of choosing the correct key (or username) for any random victim.

Next, algorithms are described which accept X and integers $\delta_1$, K, $\delta_n$ and output Y such that each entry i in Y is compatible with at least $\delta_i$ entries in X and vice-versa. These algorithms operate by finding a graph in $G_b$ or $G_s$ and achieve similar protection as k-anonymity (which finds a graph in the most restrictive family $G_k$ and therefore requires more stars). An analysis of the topology of G in these two new families is provided to show resilience to single and sustained attacks from an all-powerful adversary.

While the k-anonymity suppression problem is known to be NP-hard, a polynomial time method with an approximation guarantee is the forest algorithm which has an approximation ratio of 3k−3. In practice, though, the forest algorithm is slow and achieves poor utility compared to clustering methods. According to an embodiment, an algorithm is provided for the b-matching anonymity problem with approximation ratio of δ and runtime of $O(\delta m \sqrt{n})$ where n is the number of users in the data, δ is the largest anonymity level in {$\delta_1$, K, $\delta_n$} and m is the number of edges to explore (in the worst case with no prior knowledge, we have m=$O(n^2)$ edges between all possible users). One algorithm solves for minimum weight bipartite b-matchings which is easy to implement using linear programming, max-flow methods or belief propagation in the bipartite case. The other algorithm uses a general non-bipartite solver which involves Blossom structures and requires O(δmn log(n)) time. Fortunately, minimum weight general matching has recently been shown to require only $O(m\in^{-1} \log \in^{-1})$ time to achieve a (1−∈) approximation.

First, we define two quantities of interest. Given a graph G with adjacency matrix $G \in B^{n \times n}$ and a data-set X, the Hamming error is defined as $h(G) = \Sigma_i \Sigma_j G_{ij} \Sigma_k (X_{ik} \neq X_{jk})$. The number of stars to achieve G is $s(G) = nd - \Sigma_i \Sigma_k \Pi_j (1 - G_{ij}(X_{ik} \neq X_{jk}))$.

Recall $G_b$ is the family of regular bipartite graphs. Let $\min_{G \in G_b} s(G)$ be the minimum number of stars (or suppressions) that one can place in Y while keeping the entries in Y compatible with at least δ entries in X and vice-versa. In accordance with an embodiment, the following polynomial time algorithm (i.e., a variational bipartite b-matching algorithm or "algorithm 1") is provided which, in its first iteration, minimizes h(G) over the family $G_b$ and then iteratively minimizes a variational upper bound on s(G) using a weighted version of the Hamming distance.

Algorithm 1 variational bipartite b-matching

Input $X \in \mathbb{Z}^{n \times d}$, $\delta^i \in \mathbb{N}$ for $i \in \{1, \ldots, n\}$, $\varepsilon > 0$ and initialize
$W \in \mathbb{R}^{n \times d}$ to the all 1s matrix
While not converged{
  Set $\hat{G} = \arg\min_{G \in \mathbb{B}^{n \times n}} \Sigma_{ij} G_{ij} \Sigma_k W_{ik}(X_{ik} \neq X_{jk})$ s.t. $\Sigma_j G_{ij} = \Sigma_j G_{ji} \geq \delta^i$
  For all i and k set $W_{ik} = \exp\left(\Sigma_j \hat{G}_{ij}(X_{ik} \neq X_{jk}) \ln \frac{\varepsilon}{1+\varepsilon}\right)$
  For all i and k set $Y_{ik} = *$ if $\hat{G}_{ij} = 1$ and $X_{jk} \neq X_{ik}$ for any j
  Choose random permutation M as matrix $M \in \mathbb{B}^{n \times n}$ and
  output $Y_{public} = MY$ In one embodiment, algorithm 1 can be implemented as a batch process, or in some other type of batch-mode, and can be designed to be iterated over the entire data set. In an alternate embodiment, algorithm 1 can be implemented in a streaming or filter manner, where the steps of algorithm 1 can be distributed or streamed. More specifically, the bipartite b-matching algorithm can be distributed or streamed, and any remaining computations can be trivially solved for each data set entry through pairwise communications between data set entries connected by the recovered graph G.

The b-matching solver can be further restricted such that the graph G is symmetric with respect to both the original data X and the obfuscated data Y. (Note that here, and elsewhere, the terms obfuscate, generalize, and similar terms should be interpreted to refer to the same concept as should be clear from the context.) To do so, we require that G is a symmetric matrix. This will produce a graph $G \in G_s$. In such a situation, the value of G is recovered by a general unipartite b-matching algorithm (i.e., a variational symmetric b-matching algorithm, or "algorithm 2") rather than a bipartite b-matching program. Thus, the set of possible output solutions is strictly smaller (the bipartite formulation relaxes the symmetric one).

Algorithm 2 variational bipartite b-matching

Input $X \in \mathbb{Z}^{n \times d}$, $\delta^i \in \mathbb{N}$ for $i \in \{1, \ldots, n\}$, $\varepsilon > 0$ and initialize
$W \in \mathbb{R}^{n \times d}$ to the all 1s matrix
While not converged{
  Set $\hat{G} = \arg\min_{G \in \mathbb{B}^{n \times n}} \Sigma_{ij} G_{ij} \Sigma_k W_{ik}(X_{ik} \neq X_{jk})$ s.t. $\Sigma_j G_{ij} \geq \delta^i$, $G_{ij} = G_{ji}$
  For all i and k set $W_{ik} = \exp\left(\Sigma_j \hat{G}_{ij}(X_{ik} \neq X_{jk}) \ln \frac{\varepsilon}{1+\varepsilon}\right)$
  For all i and k set $Y_{ik} = *$ if $\hat{G}_{ij} = 1$ and $X_{jk} \neq X_{ik}$ for any j
  Choose random permutation M as matrix $M \in \mathbb{B}^{n \times n}$ and
  output $Y_{public} = MY$ In one embodiment, algorithm 2 can be implemented as a batch process, or in some other type of batch-mode, and can be designed to be iterated over the entire data set. In an alternate embodiment, algorithm 2 can be implemented in a streaming or filter manner, where the steps of algorithm 2 can be distributed or streamed.

Theorem 1
For $\delta_i \leq \delta$, iteration #1 of algorithm 1 finds $\hat{G}$ such that $s(\hat{G}) \leq \delta \min_{G \in G_b} s(G)$.

Theorem 2
Each iteration of algorithm 1 monotonically decreases $s(\hat{G})$.

Theorem 1 and 2 apply to algorithms 1 and 2. Both algorithms manipulate a bipartite regular graph G(A,B) containing the true matching $\{(a_1, b_1), K, (a_n, b_n)\}$. It can be straightforward to assign a different cost to certain suppressions over others if the utility of the data varies accordingly for each data entry, vector element, or bit. It can be straightforward to put a different weight on certain suppressions over others. This can be done by using an n×d weight matrix in the optimization. It can also be straightforward to handle missing data by allowing initial starts in X before anonymizing. However, both algorithms ultimately release the data-set $Y_{public}$ after randomly shuffling Y according to some matching or permutation M which hides the true matching. The random permutation or matching M can be represented as a matrix AI e B' or as a function $\sigma: \{1, K, n\} \to \{1, K, n\}$. It is further described below how an adversary can attack privacy by recovering this matching or parts of it.

The anonymity provided by a compatibility graph $G \in G_b$ (or $G \in G_s$) can be characterized under several attack models. The goal of the adversary is to correctly match people to as many records as possible. In other words, the adversary wishes to find the random matching M used in the algorithms (or parts of M) to connect the entries of X to the entries of $Y_{public}$, (assuming the adversary has stolen X and $Y_{public}$, or portions of them). More precisely, a bipartite graph G(A,B) with color classes A, B, each of size n can be provided. Class A corresponds to n usernames and class B to n keys. Each username in A is matched to its key in B through some unknown matching M.

We consider the model where the graph G(A,B) is $\delta$-regular, where $\delta \in N$ is a parameter chosen by the publisher. The latter is especially important if we are interested in guaranteeing different levels of privacy for different users and allowing $\delta$ to vary with the user's index i.

Sometimes it is the case that the adversary has some additional information and at the very beginning knows some complete records that belong to some people. In graph-theoretic terms, the adversary thus knows parts of the hidden matching M in advance. Alternatively, the adversary may have come across such additional information through sustained attack where previous attempts revealed the presence or absence of an edge. We are interested in analyzing how this extra knowledge can help him further reveal other edges of the matching. We aim to show that, for some range of the parameters of the bipartite graphs, this additional knowledge does not help him much. We will compare the resilience to attack relative to the resilience of k-anonymity. We say that a person v is k-anonymous if his or her real data record can be confused with at least k−1 records from different people. We first discuss the case of single attacks and then discuss sustained attacks.

Assume first that the adversary has no extra information about the matching and performs a one-time attack. Then, lemma 4.1 holds which is a direct implication of lemma 4.2.

Lemma 4.1
If G(A,B) is an arbitrary $\delta$-regular graph and the adversary does not know any edges of the matching he is looking for then every person is $\delta$-anonymous.

Lemma 4.2 Let G(A,B) be a $\delta$-regular bipartite graph. Then for every edge e of G(A,B) there exists a perfect matching in G(A,B) that uses e.

The result does not assume any structure in the graph beyond its $\delta$-regularity. Thus, for a single attack, b-matching anonymity (symmetric or asymmetric) is equivalent to k-anonymity when b=k.

Corollary 4.1
Assume the bipartite graph G(A,B) is either $\delta$-regular, symmetric $\delta$-regular or clique-bipartite and $\delta$-regular. An adversary attacking G once succeeds with probability $\leq 1/\delta$.

Now consider the situation of sustained attacks or attacks with prior information. Here, the adversary may know $c \in N$ edges in M a priori by whatever means (previous attacks or through side information). We begin by analyzing the resilience of k-anonymity where G is a cliques-structured graph. In the clique-bipartite graph, even if the adversary knows some edges of the matching (but not too many) then there still is hope of good anonymity for all people. The anonymity of every person decreases from $\delta$ to at least $(\delta-c)$. So, for example, if the adversary knows in advance $$\frac{\delta}{2}$$

edges of the matching then we get the same type of anonymity for every person as for the model with two times smaller degree in which the adversary has no extra knowledge. So we will be able to show the following:

Lemma 4.3

If G(A,B) is clique-bipartite $\delta$-regular graph and the adversary knows in advance c edges of the matching then every person is $(\delta-c)$-anonymous.

The above is simply a consequence of the following lemma.

Lemma 4.4

Assume that G(A,B) is clique-bipartite $\delta$-regular graph. Denote by M some perfect matching in G(A,B). Let C be some subset of the edges of M and let $c=|C|$. Fix some vertex $v \in A$ not matched in C. Then there are at least $(\delta-c)$ edges adjacent to v such that, for each of these edges e, there exists some perfect matching $M^e$ in G(A,B) that uses both e and C.

Corollary 4.2

Assume graph G(A,B) is a clique-bipartite and $\delta$-regular. Assume that the adversary knows in advance c edges of the matching. The adversary selects uniformly at random a vertex the privacy of which he wants to break from the set of vertices he does not know in advance. Then he succeeds with probability at most $$\frac{1}{\delta - c}.$$

We next show that b-matchings achieve comparable resilience under sustained attack.

We now consider the case where we do not have a graph G(A,B) which is clique-bipartite but rather is only $\delta$-regular and potentially asymmetric (as returned by algorithm 1).

Theorem 4.1

Let G(A,B) be a $\delta$-regular bipartite graph with color classes: A and B. Assume that $|A|+|B|=n$. Denote by M some perfect matching M in G(A,B). Let C be some subset of the edges of M and let $c=|C|$. Take some $\xi \geq c$. Denote $n'=n-c$. Fix any function $\phi$:

$$N \to R \text{ satisfying } \forall_\delta \left( \xi \sqrt{2\delta + \frac{1}{4}} < \phi(\delta) < \delta \right).$$

Then for all but at most $$\eta = \frac{2c\delta^2 n'\xi\left(1 + \frac{\phi(\delta) + \sqrt{\phi^2(\delta) - 2\xi^2\delta}}{2\xi\delta}\right)}{\phi^3(\delta)\left(1 + \sqrt{1 - \frac{2\xi^2\delta}{\phi^2(\delta)}}\right)\left(\frac{1}{\xi} - \frac{c}{\phi(\delta)} + \frac{\delta\left(1 - \frac{c}{\xi}\right)}{\phi(\delta)}\right)} + \frac{c\delta}{\phi(\delta)}$$

vertices $v \in A$ not matched in C the following holds: The size of the set of edges e adjacent to v and having the additional property that there exists some perfect matching $M^v$ in G(A,B) that uses e and edges from C is: at least $(\delta-c-\phi(\delta))$.

Essentially, theorem 4.1 says that all but at most a small number $\eta$ of people are $(\delta-c-\phi(\delta))$-anonymous for every $\phi$ satisfying: $c\sqrt{2\delta+\frac{1}{4}}<\phi(\delta)<\delta$ if the adversary knows in advance c edges of the matching. For example, take $\phi(\delta):=\theta\delta$ for $\theta \in (0,1)$. Fix $\xi=c$ and assume that the adversary knows in advance at most $\delta^{1/4}$ edges of the matching. Then, using the formula from theorem 4.1, we obtain that (for n large enough) all but at most $$\frac{4n'}{\delta^{\frac{1}{4}}\theta^3} + \frac{\delta^{\frac{1}{4}}}{\theta}$$

people from those that the adversary does not know in advance are $((1-\theta)\delta - \in^{1/4})$-anonymous. So if $\delta$ is large enough then all but approximately a small fraction $$\frac{4}{\delta^{\frac{1}{4}}\theta^3}$$

of all people not known in advance are almost $(1-\theta)\delta$-anonymous.

Again take $\phi(\delta):=\theta\delta$ where $\theta \in (0,1)$. Take $\xi=2c$. Next assume that $$1 \leq c \leq \min\left(\frac{\delta}{4}, \delta(1 - \theta - \theta^2)\right).$$

Assume that the adversary selects uniformly at random a person to attack. Our goal is to find an upper bound on the probability he succeeds. Then, using theorem 4.1, we can conclude that all but at most Fn' people whose records are not known in advance are $((1-\theta)\delta-c)$-anonymous for $$F = \frac{33c^2}{\theta^2\delta}.$$

The probability of success is at most:

$$F + (1-F)\frac{1}{(1-\theta)\delta - c}.$$

Using the expression on F that we have and our assumptions, we can conclude that the probability we are looking for is at most $$\frac{34c^2}{\theta^2\delta}.$$

Therefore we have:

Theorem 4.2

Assume graph G(A,B) is $\delta$-regular and the adversary knows in advance c edges of the matching, where c satisfies:

$$1 \le c \le \min\left(\frac{\delta}{4}, \delta(1-\theta-\theta^2)\right).$$

The adversary selects uniformly at random a vertex the privacy of which he wants to break from those that he does not know in advance. Then he succeeds with probability at most $$\frac{34c^2}{\theta^2\delta}.$$

We now consider the case where the graph is not only $\delta$-regular but also symmetric as defined in definition 2.2 and as recovered by algorithm 2. Furthermore, we consider the case where we have varying values of $\delta_i$ for each node since some users want higher privacy than others. It turns out that if the corresponding bipartite graph is symmetric (we define this term below) we can conclude that each user is $(\delta_i-c)$-anonymous, where $\delta_i$ is the degree of a vertex associated with the user of the bipartite matching graph. So we get results completely analogous to those for the much simpler models described before. We will use a slightly more elaborate definition of symmetric, however, since this graph has one if its partitions permuted by a random matching (the last step in both algorithms before releasing the data). A symmetric graph $G(A,B)$ may not remain symmetric according to definition 2.2 if nodes in B are shuffled by a permutation M. However, it will still be symmetric with respect to M according to definition 4.1.

Definition 4.1

Let $G(A,B)$ be a bipartite graph with color classes: A, B and matching $M=\{(a_1,b_1),\ldots(a_n,b_n)\}$, where $A=\{a_1,\ldots,a_n\}$, $B=\{b_1,\ldots,b_n\}$. We say that $G(A,B)$ is symmetric with respect to M if the existence of an edge $(a_i, b_j)$ in $G(A,B)$ implies the existence of an edge $(a_j,b_i)$, where $1 \le i,j \le n$.

From now on, the matching M with respect to which $G(A,B)$ is symmetric is a canonical matching of $G(A,B)$. Assume that $G(A,B)$ is symmetric with respect to its canonical matching M (it does not need to be a clique-bipartite graph). In such a case, we will prove that, if the adversary knows in advance c edges of the matching, then every person from the class A of degree $\delta_i$ is $(\delta_i-c)$-anonymous. So we obtain the same type of anonymity as in a clique-bipartite graph (see: lemma 4.3).

Lemma 4.5

Assume that $G(A,B)$ is a bipartite graph, symmetric with respect to its canonical matching M. Assume furthermore that the adversary knows in advance c edges of the matching. Then every person that he does not know in advance is $(\delta_i-c)$-anonymous, where $\delta_i$ is a degree of the related vertex of the bipartite graph.

As a corollary, we obtain the same privacy guarantees in the symmetric case as the k-cliques case.

Corollary 4.3

Assume bipartite graph $G(A,B)$ is symmetric with respect to its canonical matchings M. Assume that the adversary knows in advance c edges of the matching. The adversary selects uniformly at random a vertex the privacy of which he wants to break from the set of vertices he does not know in advance. Then he succeeds with probability at most $$\frac{1}{\delta_i-c},$$

where $\delta_i$ is a degree of a vertex of the matching graph associated with the user.

In summary, the symmetric case is as resilient to sustained attack as the cliques-bipartite case, the usual one underlying k-anonymity if we set $\delta_i=\delta=k$ everywhere. The adversary succeeds with probability at most $1/(\delta_i-c)$. However, the asymmetric case is potentially weaker and the adversary can succeed with probability at most $$\frac{34c^2}{\theta^2\delta}.$$

Interestingly, in the symmetric case with variable $\delta_i$ degrees, however, we can provide guarantees that are just as good without forcing all individuals to agree on a common level of anonymity.

Figure 3:
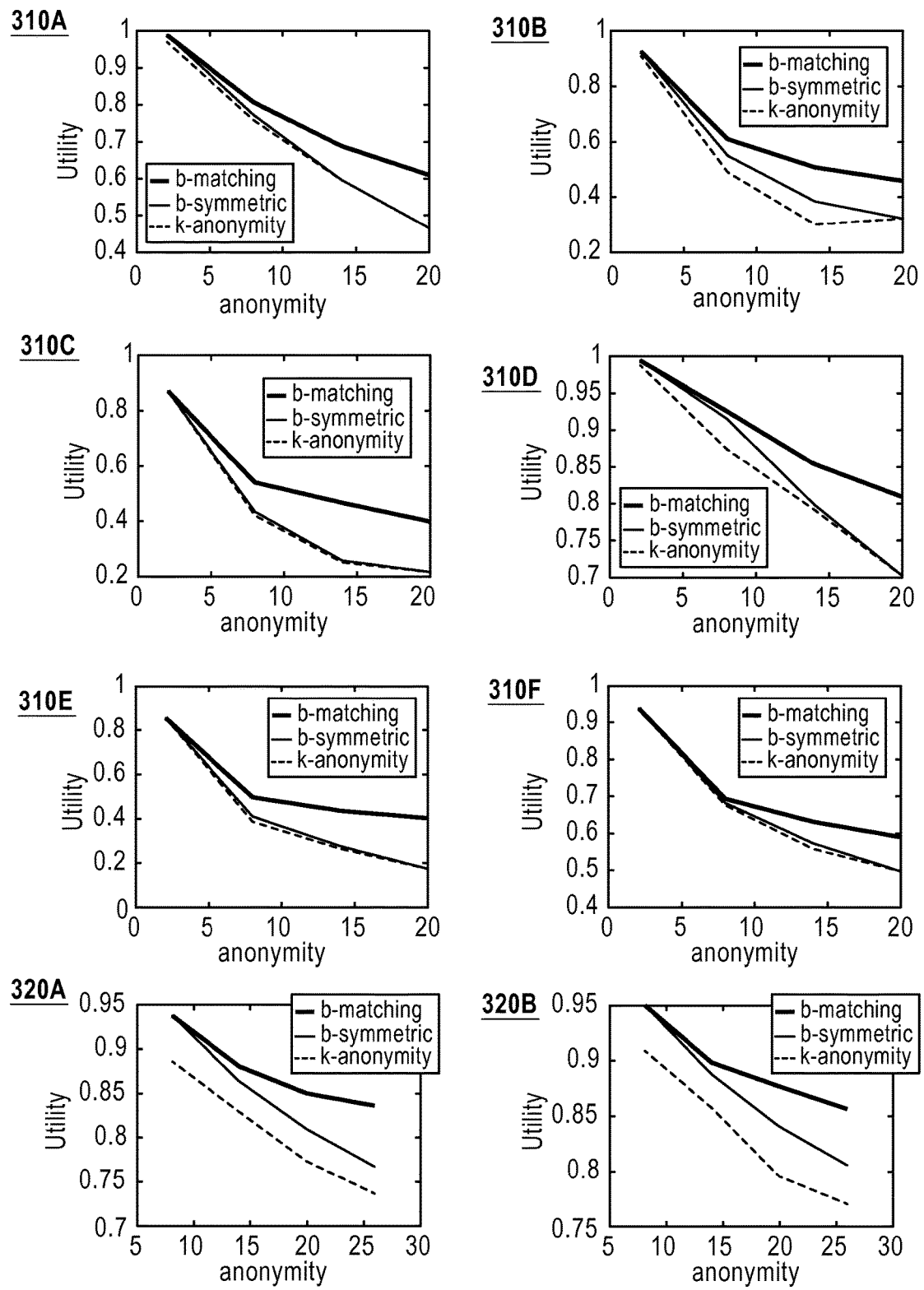
FIG. 3 are examples of utility/anonymity graphs for a variational bipartite b-matching algorithm, a variational symmetric b-matching algorithm, according to embodiments of the disclosed subject matter.

FIG. 3 are examples of utility/anonymity graphs for a variational bipartite b-matching algorithm, a variational symmetric b-matching algorithm, according to embodiments of the disclosed subject matter. According to an embodiment, algorithms 1 and 2 where compared against an agglomerative clustering competitor (optimized to minimize stars) which is known to outperform the forest method. Agglomerative clustering starts with singleton clusters and keeps unifying the two closest clusters with smallest increase in stars until clusters grow to a size at least k. Both algorithms release data with suppressions to achieve a desired constant anonymity level $\delta$. For the two algorithms, we swept values of E in $\{2^{-1}, 2^{-2}, K, 2^{-10}\}$ from largest to smallest and chose the solution that produced the least number of stars. Furthermore, we warm-started the variational symmetric b-matching algorithm with the star-pattern solution of the variational bipartite b-matching algorithm to make it converge more quickly. We first explored six standard data-sets from UCI in the uniform anonymity setting. Utility/anonymity graphs 310A, 310B, 310C, 310D, 310E, and 310F of FIG. 3 summarizes the results where utility is plotted against $\delta$. Fewer stars imply greater utility and larger $\delta$ implies higher anonymity. We discretized each numerical dimension in a data-set into a binary attribute by finding all elements above and below the median and mapped categorical values in the data-sets into a binary code (potentially increasing the dimensionality). Algorithm 1 achieved significantly better utility for any given fixed constant anonymity level $\delta$ while algorithm 2 achieved a slight improvement. We next explored Facebook social data experiments where each user has a different level of desired anonymity and has 7 discrete profile attributes which were binarized into d=101 dimensions. We used the number of friends $f_i$ a user has to compute their desired anonymity level (which decreases as the number of friends increases). We set $F=\max_{i=1,Kn}\lfloor \log f_i \rfloor$ and, for each value of $\delta$ in the plot, we set user i's privacy level to $\delta_i=\delta(F-\lfloor \log f_i \rfloor)$. Utility/anonymity graphs 320A and 320B of FIG. 3 summarizes the results where utility is plotted against $\delta$. Since the k-anonymity agglomerative clustering method requires a constant $\delta$ for all users, we set $k=\max_i \delta_i$ in order to have a privacy guarantee. Algorithms 1 and 2 consistently achieved significantly better utility in the adaptive anonymity setting while also achieving the desired level of privacy protection.

Figure 4:
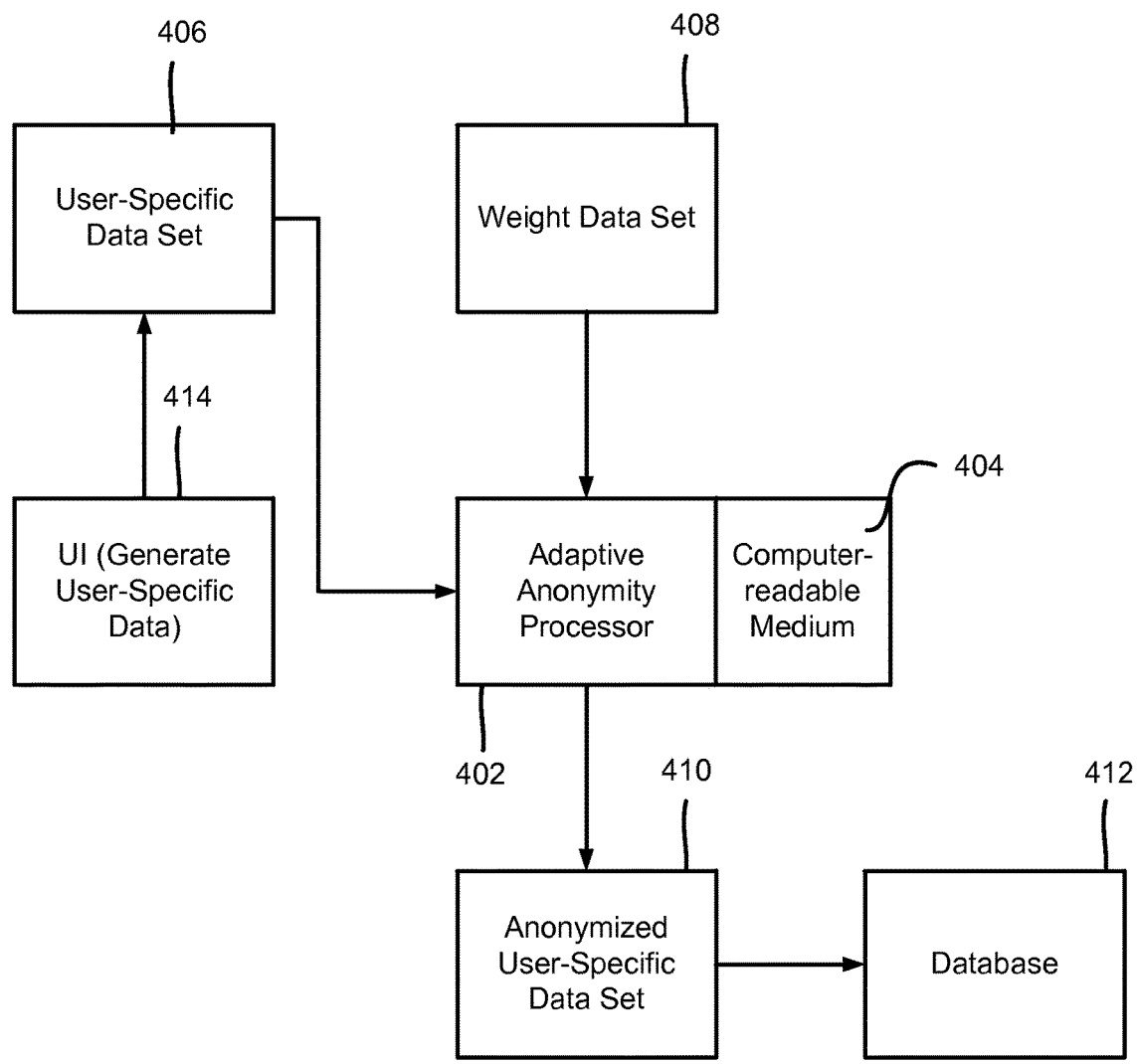
FIG. 4 is a block diagram of an example embodiment of a system for providing adaptive anonymity via b-matching.

FIG. 4 is a block diagram of an example embodiment of a system 400 for providing adaptive anonymity via b-matching, which may be used in whole or in part to form various embodiments. Those embodiments may include a computer system, a distributed computer system operating over a computer network, a social network computer system, a medical data system, a research data system, or a computerized recommendation system. A system 400 includes an adaptive anonymity processor 402 which may incorporate, or be connected with, a non-volatile data store such as a computer-readable medium 404. A drive or I/O system may be inherent in the computer readable medium 404. The computer-readable medium 404 may store and retrieve program code and data. The program code may be methods for implementing any of the disclosed methods for providing adaptive anonymity via b-matching as well as code that generates compatibility graphs between data sets and that anonymizes specific data values within a data set. The computer-readable medium 404 can include an electronic (e.g., random-access memory ("RAM"), read-only memory ("ROM"), flash memory, electrically erasable programmable read-only memory ("EEPROM"), or the like), optical (compact disc read-only memory ("CDROM"), DVD, or the like), or magnetic (hard disk, floppy disk, or the like) data storage medium. The adaptive anonymity processor 402 may also employ cloud storage where the latter may incorporate computer readable medium 404 and communicate with the processor 402 through a network or internet.

In operation, the adaptive anonymity processor 402 receives a user-specific data set 406 as input. Optionally, user-specific data set 406 can be generated by a user using a user interface 414. Further, user-specific data set 406 can be compiled from data that is continuously captured by system 400. A data set can include one or more data sequences (e.g., vectors), where a data sequence can include one or more data values (e.g., elements). User-specific data set 406 can include discrete attributes, or data values, pertaining to one or more specific users. For example, user-specific data set 406 can contain a user's gender, race, height, weight, age, income bracket, etc. User-specific data set 406 can further include one or more anonymity parameters that pertain to one or more specific users, and that represent one or more desired anonymity levels of the one or more specific users. For example the one or more anonymity parameters can be one or more integer value, where each integer value represents a desired anonymity level for a corresponding user. A desired anonymity level can be, for example, a condition that a user's user-specific data is sufficiently suppressed so that the user's user-specific data is not distinguishable from user-specific data for n users, where n is an integer value specified by the anonymity parameter.

Using techniques that are previously described, the adaptive anonymity processor 402 can identify and generate a compatibility graph (e.g., a bipartite graph or a symmetrical graph) between the user-specific data set 406 and anonymized user-specific data set 410 using weight data set 408, where a variable anonymity level for each user is provided, and where a minimum number of the data values of the user-specific data within the user-specific data set 406 is suppressed within anonymized user-specific data set 408, and where the adaptive anonymity processor 402 produces the anonymized user-specific data set 408 as output. The compatibility graph and the minimum number of data values can be optimized based on the techniques that have been previously described. Note that the user-specific data set 406, the weight data set 408, and the anonymized user-specific data set 410 are indicated by boxes but it will be understood that this is a figurative representation and the actual inputs and outputs would be stored as data on the computer readable medium 404 or an equivalent. Adaptive anonymity processor 402 can further store the anonymized user-specific data set 410 within database 412, or some other type of data storage. Within database 412, the anonymized user-specific data set 410 can be utilized by system 400 for various functionalities, such as recommending user matches or products to users. However, because a portion of the user-specific data of the anonymized user-specific data set 408 is suppressed, anonymity of the one or more specific users can be preserved, even in an event where some or all of the anonymized user-specific data set 408 is compromised.

The adaptive anonymity processor 402 can include a microprocessor, microcontroller, digital signal processor, field-programmable gate array ("FPGA"), application-specific integrated circuit ("ASIC"), or the like. Also, the adaptive anonymity processor 402 can be a single processor or a co-located or distributed multi-processor system, having a parallel processing architecture, a cloud computing architecture, or the like.

Figure 5:
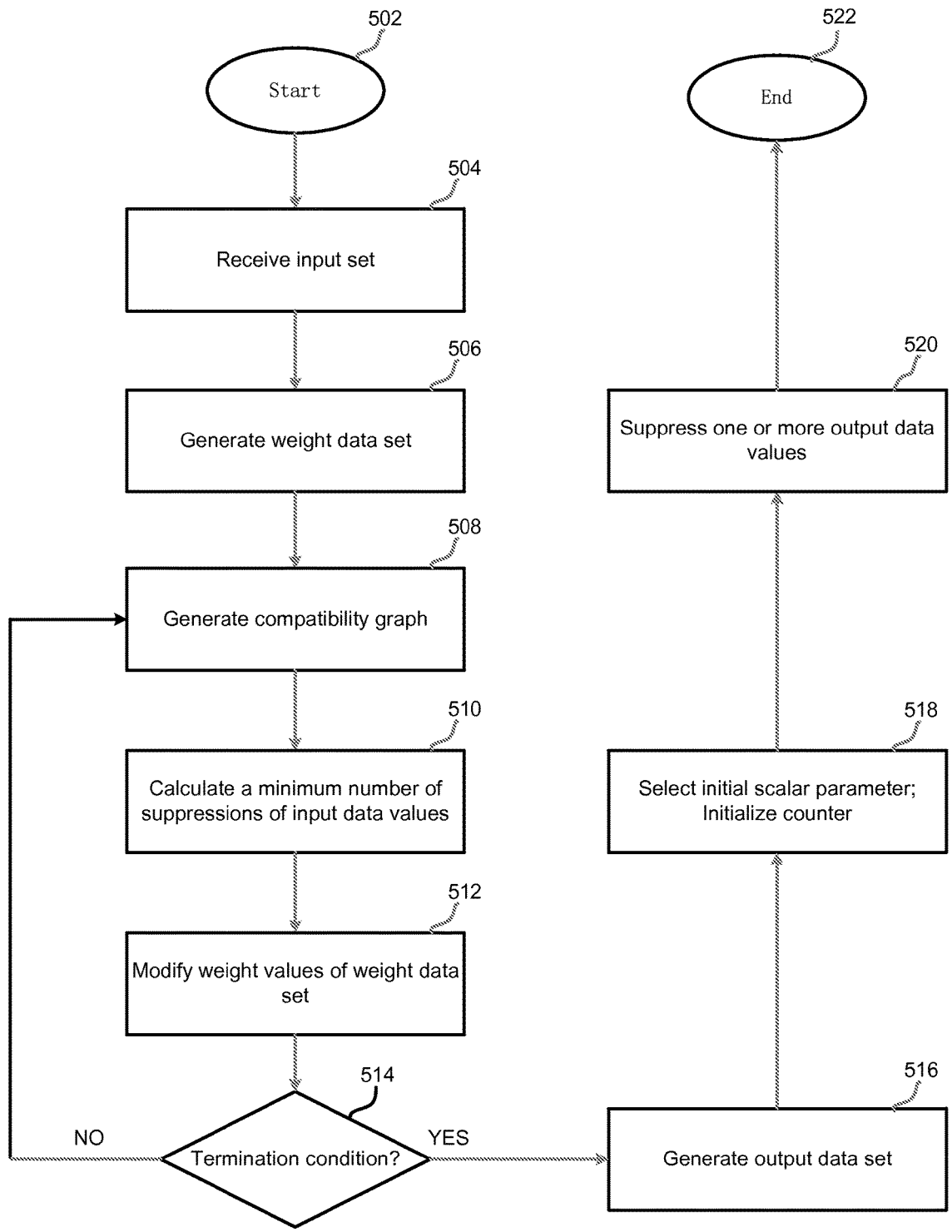
FIG. 5 is a flowchart showing an example embodiment of a method for providing adaptive anonymity via b-matching, according to embodiments of the disclosed subject matter.

FIG. 5 is a flowchart showing an example embodiment of a method for providing adaptive anonymity via b-matching. Processing begins at 502 and continues to 504. At 504, an input set is received from one or more users. The input data set includes one or more discrete input sequences and one or more anonymity parameters. An input data sequence includes one or more data values associated with a user. The one or more data values can include one or more attributes that, at least in part, identify the user. An anonymity parameter includes an integer value that represents a desired anonymity level. The one or more anonymity parameters can be variable anonymity parameters. In other words, at least one anonymity parameter can be distinct from at least one other anonymity parameter. In certain embodiments, the input set can be compiled from data that is continuously captured by a computer system. Processing continues to 506.

At 506, a weight data set is generated. The weight data set includes one or more weight data sequences. A weight data sequences includes one or more weight values. Each weight data sequence of the one or more weight data sequences can include one or more ones. Processing continues to 508.

At 508, a compatibility graph including one or more edges is generated. An edge connects an input data sequence of the input data set to one or more distinct input data sequences of the input data set. The input data sequence is connected to a number of distinct input data sequences that is greater than or equal to the anonymity parameter associated with the input data sequence. A weight value of the weight data is applied to an edge where the input data sequence is not compatible with a distinct input data sequence. According to an embodiment, a first data sequence is compatible with a second data sequence where a data value of the first data sequence is equal to a data value of the second data sequence for all data values of the second data sequence that are not suppressed. The compatibility graph can be a bipartite graph or a symmetrical graph. Processing continues to 510.

At 510, a minimum number of suppressions of the input data values that are required so that the input data sequence that is connected to a distinct input data sequence by an edge of the compatibility graph is compatible with the distinct input data sequence is calculated. The calculating the minimum number of suppressions can include identifying and storing one or more input data values that are required to be suppressed so that the input data sequence that is connected to a distinct input data sequence by an edge of the compatibility graph is compatible with the distinct input data sequence. Process continues to 512.

At 512, at least one weight value of the weight data set is modified. The modifying can include increasing a weight value of the weight data set that is applied to an edge where the input data sequence is not compatible with a distinct input data sequence. Processing continues to 514.

At 514, it is determined whether a termination condition is reached. The termination condition can be the minimum number of suppressions required by the compatibility graph ceasing to decrease. If the termination condition is not reached, processing returns to 508. If the termination condition is reached, processing continues to 516.

At 516, an output data set is generated. The output data set includes one or more output data sequences. An output data sequence includes one or more output data values. The one or more output data values are equal to the one or more input data values of the input data set. Processing continues to 518.

At 518, one or more output data values of the one or more output data sequences of the output data set according to the minimum number of suppressions required by the compatibility graph. The suppressing of the one or more output data values can include masking or hiding the one or more output data values. The output data set can optionally be randomly shuffled according to a defined permutation. Processing continues to 520.

At 520, the output data set is output. The outputting the output data set can include storing the output data set within a database, or other type of data storage. Processing continues to 522 where processing ends.

The method of FIG. 5 can be implemented via a programmed processor having access to software instructions stored on a non-transitory computer-readable medium. A non-transitory computer-readable medium includes a hard drive, a compact disc, flash memory, volatile memory, an optical memory, an optical loop memory, a loop memory, a regenerated memory, a removable memory, RAM, ROM, programmable read-only memory ("PROM"), erasable programmable read-only memory ("EPROM"), EEPROM, cache, remote memory, local memory, buffer, and another other non-transitory medium, but does not include a transitory signal per se. The software instructions, when executed, cause the processor to perform the operations previously described and illustrated in FIG. 5.

Figure 6:
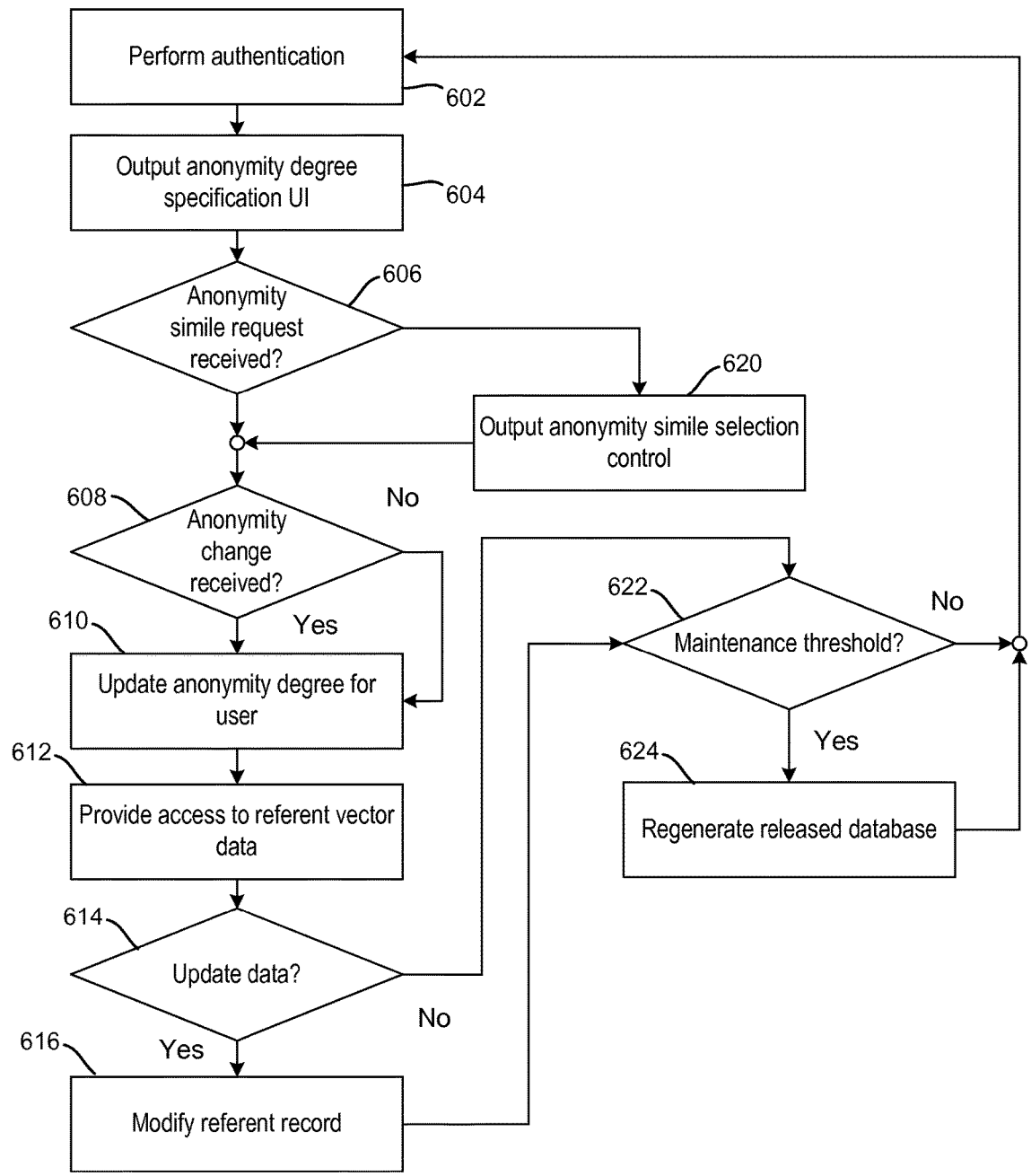
FIG. 6 shows a method for updating a private database and a released database, according to embodiments of the disclosed subject matter.

FIG. 6 shows a method for updating a private database and a released database, according to embodiments of the disclosed subject matter. The process begins at 602 with authentication of a user. This may be performed by a server by generating a secure web page including the generating and transmitting of authentication controls such as for receiving and returning username and password combinations. Among the controls or other user interface elements generated, the server may present one for allowing the user to modify a referent profile to allow data relating to one or more referents to be modified. For example, in a database in which the referents are users themselves, the profile may contain personal data, such as age, income, education, prior addresses, relationships to other users, etc. In an embodiment, the database is a social media database. In another, the database profile is updated automatically be interacting with a server-generated system such as a vendor website. Purchase history and user profile preferences may then constitute the personal information stored by the server database. The database may also store data relating other referents such as real estate properties, census data, or other information. The profile data may include an anonymity degree preference which may be specified for each or groups of the database referents. To facilitate understanding and accuracy of anonymity choices presented by the server, the server may present a control at 604 which allows the anonymity degree to be specified in terms of an understandable magnitude estimation. For example, rather than asking the user to specify how many other referents in the database a particular referent should be indistinguishable from, the server may present a control that provides choices such as the following:

The referent could be localized to any living within a four block radius of Brooklyn;

The referent could be localized to any in the borough of Staten Island;

The referent could be localized to any in the island of Manhattan;

The referent could be localized to any in the state of New York;

The referent could be localized to any in the country of Canada;

The referent could be localized to any in the United States.

The referents could be articles, people, properties, or other things and the similes could be of any suitable type that facilitates recognition and understanding of the user. A feature of the above scheme is that the distribution of values of the anonymity can be organized in ranks that are separated by a predefined distance which may be on a predefined scale (e.g., logarithmic or linear scale) where the predefined distance may be chosen according to criteria chosen because for ease of understanding using comparatives that place the anonymity metric in a context that makes the number comparable to familiar ones. If a person believe he would feel sufficiently anonymous living in Manhattan, but not living in a small town, that provides a quantitative dividing line that facilitates selection.

If the user wishes to make a new selection with the aid of such a simile, then at 620, the server may generate it and if an anonymity degree change is request is received at 608, then a new value may be stored in a profile associated with the referent at 610. At 612, the authenticated user may then be permitted access to the referent vector for updating using suitable controls for a form or a batch upload or any other known mechanism. If an update request is made 614, one or more records may be modified 616 and it is determined if a maintenance threshold has been reached at 622 which determines when the released database needs to be regenerated 624. A maintenance threshold may be any that ensure that the privacy guarantees of the anonymity degrees for all the records in the database. The threshold may be based on various criteria such as the number of records that have been changed, the net information content changed in the database as a whole, the time since the released database was last generated, the number of records added or deleted, or a combination of these. Other more sophisticated criteria may be developed which may be approximate predictors of compromise of the privacy guarantees as function of the type and amount of changes in the database. By restricting the values of anonymity degrees to stepped intervals, the privacy guarantees afforded by the database may have dead zones in them that makes it possible to reduce the frequency of released database regenerations while adhering to privacy guaranteeing privacy within predefined ranges.

Thus, according to embodiments, data that characterizes referents are obfuscated to guarantee individual or group privacy settings corresponding to data referents. According to the embodiments, a relaxation of k-anonymity is generated, where the relaxation of k-anonymity is implemented procedurally by a computer-implemented method, apparatus, or system, and/or according to a procedure stored on a computer-readable medium. The algorithm can yield the required privacy protections while providing greater utility and the ability to handle heterogeneous anonymity levels for each referent.

According to first embodiments, the disclosed subject matter includes a data filtering method for a communication system connecting a source of private data with a user over a network, comprising. The method begins with, at at least one network server, receiving private data from first multiple remote stations connected over a network, the private data including vectors, each characterizing a referent, the referents including objects, events, or persons. The method continues with, at the at least one network server determining privacy requirement data corresponding to subsets of the referents and filtering the private data to generate released data, the filtering including suppressing elements of the vectors characterizing each subset of the referents according to the privacy requirement data respective thereto. The suppressing is such that the number of groups of indistinguishable referents in the released data is higher than in the private data and the size of the groups varies according to the privacy requirement data. The method further includes, from the at least one network server, transmitting data derived from the released data to one or more receivers.

According to variations thereof, the first embodiments may be modified to form additional first embodiments in which the referents are persons and the vectors include personal data further including relationships among the persons. According to variations thereof, the first embodiments may be modified to form additional first embodiments in which the referents are persons and the vectors include purchase history. According to variations thereof, the first embodiments may be modified to form additional first embodiments in which the transmitting includes publishing the data derived from the released data to a social media web page. According to variations thereof, the first embodiments may be modified to form additional first embodiments in which the determining includes receiving the privacy requirement data over a network from the first multiple remote stations. According to variations thereof, the first embodiments may be modified to form additional first embodiments in which the privacy requirement data each includes an integer that corresponds to a size of a respective one of the groups. According to variations thereof, the first embodiments may be modified to form additional first embodiments in which the suppressing includes performing an optimization based on a graph representation of the private data. According to variations thereof, the first embodiments may be modified to form additional first embodiments in which the suppressing includes: generating a compatibility graph with edges, each edge connecting each vector to N other vectors, where N is greater than or equal to the anonymity parameter respective to the referent corresponding to the each vector, a weight value being applied to each edge connecting incompatible input data sequences and performing a b-matching on the compatibility graph to calculate a minimum number of vector elements to suppress in order to satisfy constraints in the privacy requirements data.

According to second embodiments, the disclosed subject matter includes a system for presenting content of a released database relating to referents. The referents may be individuals, events, or objects, or a variety of other things that can be described. The released database contains data corresponding to a private database that has been anonymized to resist attacks on referent data according to an anonymity degree preference respective to each referent or group thereof. The second embodiment system includes a computer network or Internet joining data consumers to a released database and sources of data relating to the referents to a private database. A network server is connected to receive referent-characterizing data over a network, the referent-characterizing data relating to a first referent, the server being programmed update a first vector corresponding to the first referent stored in a database with second vectors corresponding to second referents. The network server stores desired anonymity data, each being respective to the first referent and the second referents or group thereof. The network server is further programmed to generate the content of the released database, which contains anonymized referent-characterizing data corresponding to the first and second referents, such that the anonymized data corresponding to the first referent is the same as anonymized data corresponding to K second referents, where K is a number selected responsively to the anonymity data respective to the first referent and such that each of the anonymized data corresponding to the second referents is the same as the anonymized data corresponding to L second referents, where each L is a number selected responsively to the anonymity data respective to the second referents. The network server is further programmed to connect the released database to render it readable by users of the network.

According to variations thereof, the second embodiments may be modified to form additional second embodiments in which the network server is programmed to generate the content of the release database by optimizing a graph representation of indistinguishable referents in the referent-characterizing data with edge weights determined by the anonymity data.

According to variations thereof, the second embodiments may be modified to form additional second embodiments in which the anonymity data is stored in the private database.

According to third embodiments, the disclosed subject matter includes a method for anonymizing captured data that represents real entities including users, events, or objects, to limit a latent correlation in accessible data derived from the captured data according to respective anonymity criteria, while maximizing a utility of the latent correlation. The method includes, over a digital network that is geographically distributed so as to receive data from multiple separate locations, continuously receiving, by an input/output system, captured data representing entities and anonymity parameters associated respectively with the entities from the multiple separate locations. The method includes continuously updating stored data that represents the entities on a computer-readable data storage in response to the continuously receiving, such that a database of the stored data is maintained. The method further includes, in response to a request event, calculating a correlation between two or more entities based on the stored data. The method further includes transmitting correlation data representing the correlation to a location in response to the calculating. The calculating includes storing input data sequences which depend on the stored data, the input data sequences each including data values characterizing an entity and an anonymity parameter dependent from the anonymity data and respective to the same entity, each anonymity parameter including an integer value indicating an anonymity degree, the anonymity parameters varying among the input data sequences, the data values of each input data sequence being specified and unspecified, each input data sequence being compatible with other input sequences where the corresponding specified data values are the same. The calculating further includes generating weight data sequences, each including weight values. The calculating further includes generating a compatibility graph with edges, each connecting each input data sequence to N other input data sequences, where N is greater than or equal to the anonymity parameter respective to the each input data sequence, a weight value of being applied to each edge connecting incompatible input data sequences. The calculating further includes calculating a minimum number of the input data values of each input data sequence to convert to unspecified values such that the each input data sequence is connected to other input data sequences by edges of the compatibility graph indicating the each input data sequence is compatible with the other input data sequences and modifying at least one weight value of the weight data set. The calculating further includes repeating the generating, the calculating, and the modifying the at least one weight value until a termination condition is reached and generating, by the processor, an output data set, the output data set comprising one or more output data sequences, wherein an output data sequence comprises one or more output data values, and wherein the one or more output values are equal to the one or more input data values of the input data set. The calculating further includes suppressing, by the processor, one or more output data values of the one or more output data sequences of the output data set according to the minimum number of suppressions required by the compatibility graph. The method includes outputting, by the processor, the output data set.

According to variations thereof, the third embodiments may be modified to form additional third embodiments in which the outputting the output data set comprises storing the output data set within the database.

According to variations thereof, the third embodiments may be modified to form additional third embodiments in which each weight data sequence of the one or more weight data sequences of the weight data set initially comprises one or more ones.

According to variations thereof, the third embodiments may be modified to form additional third embodiments in which the compatibility graph is a bipartite graph.

According to variations thereof, the third embodiments may be modified to form additional third embodiments in which the compatibility graph is a symmetrical graph.

According to variations thereof, the third embodiments may be modified to form additional third embodiments that include randomly shuffling the output data set according to a defined permutation.

According to variations thereof, the third embodiments may be modified to form additional third embodiments in which the termination condition comprises the minimum number of suppressions required by the compatibility graph ceasing to decrease.

According to variations thereof, the third embodiments may be modified to form additional third embodiments in which the modifying at least one weight value of the weight data set comprises increasing a weight value of the weight data set that is applied to an edge where the input data sequence is not compatible with a distinct input data sequence.

According to variations thereof, the third embodiments may be modified to form additional third embodiments in which the calculating the minimum number of suppressions further comprises identifying and storing one or more input data values that are required to be suppressed so that the input data sequence that is connected to a distinct input data sequence by an edge of the compatibility graph is compatible with the distinct input data sequence.

According to variations thereof, the third embodiments may be modified to form additional third embodiments in which the one or more data values associated with a user comprises one or more attributes that, at least in part, identify the user.

According to third embodiments, the disclosed subject matter includes an apparatus for anonymizing captured data that represents entities comprising users, events, or objects, upon storage or retrieval of the data, to limit a latent correlation in the stored or retrieved data, thereby maximizing a utility of the latent correlation. The apparatus includes an input/output processor configured to continuously receive the captured data and anonymity data associated with the entities from multiple locations. A data storage processor is configured to continuously update stored data that represents the entities on a computer-readable data storage in response to the continuously receiving of the input/output processor, wherein a database of the stored data is maintained. A processor is configured to load and execute software instructions stored on a computer readable medium, the software instructions, when executed, cause the processor to perform calculating a correlation between two or more entities based on the stored data and transmitting correlation data representing the correlation in response to the calculating. The calculating includes storing input data sequences which depend on the stored data, the input data sequences each including data values characterizing an entity and an anonymity parameter dependent from the anonymity data and respective to the same entity, each anonymity parameter including an integer value indicating an anonymity degree, the anonymity parameters varying among the input data sequences, the data values of each input data sequence being specified and unspecified, each input data sequence being compatible with other input sequences where the corresponding specified data values are the same. The calculating further includes generating weight data sequences, each including weight values. The calculating further includes generating a compatibility graph with edges, each connecting each input data sequence to N other input data sequences, where N is greater than or equal to the anonymity parameter respective to the each input data sequence, a weight value of being applied to each edge connecting incompatible input data sequences. The calculating further includes calculating a minimum number of the input data values of each input data sequence to convert to unspecified values such that each input data sequence is connected to a distinct input data sequence by an edge of the compatibility graph is compatible with the distinct input data sequence. The calculating further includes modifying at least one weight value of the weight data set. The calculating further includes repeating the generating the compatibility graph, the calculating the minimum number of suppressions, and the modifying the at least one weight value until a termination condition is reached. The calculating further includes generating an output data set, the output data set comprising one or more output data sequences, wherein an output data sequence comprises one or more output data values, and wherein the one or more output values are equal to the one or more input data values of the input data set and suppressing one or more output data values of the one or more output data sequences of the output data set according to the minimum number of suppressions required by the compatibility graph. The apparatus is adapted to output the output data set over a network for transmission to a receiving server.

According to variations thereof, the fourth embodiments may be modified to form additional fourth embodiments in which the calculating includes randomly shuffling the output data set according to a defined permutation.

According to variations thereof, the fourth embodiments may be modified to form additional fourth embodiments in which the termination condition comprises the minimum number of suppressions required by the compatibility graph ceasing to decrease.

According to variations thereof, the fourth embodiments may be modified to form additional fourth embodiments in which the modifying at least one weight value of the weight data set comprises increasing a weight value of the weight data set that is applied to an edge where the input data sequence is not compatible with a distinct input data sequence.

According to variations thereof, the fourth embodiments may be modified to form additional fourth embodiments in which the calculating the minimum number of suppressions further comprises identifying and storing one or more input data values that are required to be suppressed so that the input data sequence that is connected to a distinct input data sequence by an edge of the compatibility graph is compatible with the distinct input data sequence.

According to fifth embodiments, the disclosed subject matter includes a non-transitory computer-readable medium having instructions stored thereon that, when executed by a processor, cause the processer to perform operations. The operations include continuously receiving the captured data and anonymity data associated with the entities from multiple locations and continuously updating stored data that represents the entities on a computer-readable data storage in response to the continuously receiving, wherein a database of the stored data is maintained. In response to a request event, a correlation between two or more entities is calculated based on the stored data. The correlation data representing the correlation is transmitted to a location in response to the calculating. The calculating includes compiling an input data set from the stored data, the input data set comprising one or more discrete input data sequences and one or more anonymity parameters of the anonymity data, wherein an input data sequence comprises one or more data values associated with an entity, and an anonymity parameter comprises an integer value that represents a desired anonymity level, and wherein at least one anonymity parameter is distinct from at least one other anonymity parameter. The calculating further includes generating a weight data set, the weight data set comprising one or more weight data sequences, wherein a weight data sequence comprises one or more weight values. The calculating further includes generating a compatibility graph comprising one or more edges, wherein an edge connects an input data sequence of the input data set to one or more distinct input data sequences of the input data set, wherein the input data sequence is connected to a number of distinct input data sequences that is greater than or equal to the anonymity parameter associated with the input data sequence, wherein a weight value of the weight data set is applied to an edge where the input data sequence is not compatible with a distinct input data sequence. The calculating further includes calculating a minimum number of suppressions of the input data values that are required so that the input data sequence that is connected to a distinct input data sequence by an edge of the compatibility graph is compatible with the distinct input data sequence. The calculating further includes modifying at least one weight value of the weight data set. The calculating further includes repeating the generating the compatibility graph, the calculating the minimum number of suppressions, and the modifying the at least one weight value until a termination condition is reached. The calculating further includes generating an output data set, the output data set comprising one or more output data sequences, wherein an output data sequence comprises one or more output data values, and wherein the one or more output values are equal to the one or more input data values of the input data set. The calculating further includes suppressing one or more output data values of the one or more output data sequences of the output data set according to the minimum number of suppressions required by the compatibility graph. The operations include outputting the output data set.

According to variations thereof, the fifth embodiments may be modified to form additional fifth embodiments in which the operations include randomly shuffling the output data set according to a defined permutation.

According to variations thereof, the fifth embodiments may be modified to form additional fifth embodiments in which the termination condition comprises the minimum number of suppressions required by the compatibility graph ceasing to decrease.

According to variations thereof, the fifth embodiments may be modified to form additional fifth embodiments in which the modifying at least one weight value of the weight data set comprises increasing a weight value of the weight data set that is applied to an edge where the input data sequence is not compatible with a distinct input data sequence.

According to variations thereof, the fifth embodiments may be modified to form additional fifth embodiments in which the calculating the minimum number of suppressions further comprises identifying and storing one or more input data values that are required to be suppressed so that the input data sequence that is connected to a distinct input data sequence by an edge of the compatibility graph is compatible with the distinct input data sequence.

According to sixth embodiments, the disclosed subject matter includes a method for anonymizing captured data that represents entities comprising users, events, or objects, upon storage or retrieval of the data, to limit a latent correlation in the stored or retrieved data, thereby maximizing a utility of the latent correlation. The method includes continuously receiving, by a client processor, the captured data and anonymity data associated with the entities from multiple locations. The method includes continuously updating, by the client processor, stored data that represents the entities on a computer-readable data storage in response to the continuously receiving, wherein a database of the stored data is maintained. The method includes compiling, by an anonymizing processor, an input data set from the stored data, the input data set comprising one or more discrete input data sequences and one or more anonymity parameters of the anonymity data, wherein an input data sequence comprises one or more data values associated with an entity, and an anonymity parameter comprises an integer value that represents a desired anonymity level, and wherein at least one anonymity parameter is distinct from at least one other anonymity parameter. The method includes generating, by the anonymizing processor, a weight data set, the weight data set comprising one or more weight data sequences, wherein a weight data sequence comprises one or more weight values. The method includes generating, by the anonymizing processor, a compatibility graph comprising one or more edges, wherein an edge connects an input data sequence of the input data set to one or more distinct input data sequences of the input data set, wherein the input data sequence is connected to a number of distinct input data sequences that is greater than or equal to the anonymity parameter associated with the input data sequence, wherein a weight value of the weight data set is applied to an edge where the input data sequence is not compatible with a distinct input data sequence. The method includes calculating, by the anonymizing processor, a minimum number of suppressions of the input data values that are required so that the input data sequence that is connected to a distinct input data sequence by an edge of the compatibility graph is compatible with the distinct input data sequence. The method includes modifying, by the anonymizing processor, at least one weight value of the weight data set and repeating, by the anonymizing processor, the generating the compatibility graph, the calculating the minimum number of suppressions, and the modifying the at least one weight value until a termination condition is reached. The method includes generating, by the anonymizing processor, an output data set, the output data set comprising one or more output data sequences, wherein an output data sequence comprises one or more output data values, and wherein the one or more output values are equal to the one or more input data values of the input data set. The method includes suppressing, by the anonymizing processor, one or more output data values of the one or more output data sequences of the output data set according to the minimum number of suppressions required by the compatibility graph and outputting, by the anonymizing processor, the output data set into the stored data of the database. The method includes in response to a request event, calculating, by a server processor, a correlation between two or more entities based on the stored data. The method includes transmitting, by the server processor, correlation data representing the correlation to a location in response to the calculating.

According to variations thereof, the sixth embodiments may be modified to form additional sixth embodiments in which the calculating the minimum number of suppressions further comprises identifying and storing one or more input data values that are required to be suppressed so that the input data sequence that is connected to a distinct input data sequence by an edge of the compatibility graph is compatible with the distinct input data sequence.

According to seventh embodiments, the disclosed subject matter includes a system for presenting content of a released database relating to referents, the referents being individuals, events, or objects, the released database containing data corresponding to a normal database that has been anonymized to resists attacks on referent data according to an anonymity degree preference respective to each referent or group thereof. The system includes a computer network or Internet that links one or more data consumer terminals to a released database stored on a server with a fixed data storage device and terminals supplying data relating to the referents to a private database. The server is connected to receive referent-characterizing data over a network, the referent-characterizing data relating to a first referent, the server being programmed update a first vector corresponding to the first referent stored in a database with second vectors corresponding to second referents. The network server stores desired anonymity data, each being respective to the first referent and the second referents or group thereof. The network server is further programmed to revise the content of the released database, which contains anonymized referent-characterizing data corresponding to the first and second referents, such that the anonymized data corresponding to the first referent is the same as anonymized data corresponding to K second referents, where K is a number selected responsively to the anonymity data respective to the first referent and such that each of the anonymized data corresponding to the second referents is the same as the anonymized data corresponding to L second referents, where each L is a number selected responsively to the anonymity data respective to the second referents. The network server is further programmed to connect the released database to render it readable by users of the network.

According to eighth embodiments, the disclosed subject matter includes a system for protecting against malicious use of information in a database. A computer network includes one or more hosting servers that store referent data in a secure database, the referent data describing referents, the referents including individuals, events, or objects. The one or more hosting servers generate a first authentication interface to protect the secure database to ensure the secure database referent data is accessible only to secure agents that transmit security data to the authentication interface, the secure agents including persons and/or applications through accessing servers or terminal computer devices. The referent data includes referent records, each record including identifying data and a descriptive vector, each descriptive vector indicating one or more characteristics of a respective referent identified by respective identifying data. The one or more hosting servers maintain a released database to store anonymized data derived from the contents of the secure database, the anonymized data being having records with descriptive vectors that are updated responsively to changes in the secure database. The released database records are calculated from the secure database records by the hosting servers such that each contains the data of a referent record vector degenerated to make it indistinguishable from, but not necessarily identical to, a number of other referent record vectors, where the number of other referent records is calculated from an anonymity degree preference respective to each referent or group thereof, the anonymity degree preferences being stored by the one or more hosting servers.

According to variations thereof, the eighth embodiments may be modified to form additional eighth embodiments in which the released database records are such that a first referent can be statistically matched to a smaller number of released database referent vectors than a second referent based solely on the referent data in the released database.

According to ninth embodiments, the disclosed subject matter includes a communications system filter with a data receiver connected by at least one digital channel and adapted for receiving multiplexed received data from multiple remote stations. The received data includes descriptive data that describe referent referents, that include objects, events, or persons, as well as anonymity data that define anonymity degrees respective to the referent referents. A data transmitter selectively suppresses information in the descriptive data according to the respective anonymity degrees that correspond to the associated referents to generate corresponding output data. The suppression performs an optimization on a graph representation of a stored quantity of the received data. The optimization includes an implementation of a bipartite graph b-matching that permits the numbers of edges between nodes of the graph to vary according to a node, where each node corresponds to a referent referent.

According to variations thereof, the ninth embodiments may be modified to form additional ninth embodiments in which the referent referents are persons and the descriptive data includes personal information about the persons.

According to variations thereof, the ninth embodiments may be modified to form additional ninth embodiments in which the data receiver stores the received data and updates a private database records that correspond respectively to the referent referents.

According to variations thereof, the ninth embodiments may be modified to form additional ninth embodiments in which the output data includes vectors, each corresponding to a respective one of the referent referents, where a first set of the vectors is indistinguishable, but non-identical, from each other.

According to variations thereof, the ninth embodiments may be modified to form additional ninth embodiments in which vectors within the first set are rendered indistinguishable by the suppression of information in the descriptive data by the data transmitter.

According to variations thereof, the ninth embodiments may be modified to form additional ninth embodiments in which a released or anonymized data distribution of indistinguishable referents can be represented as a symmetric matrix representing bipartite links.

According to tenth embodiments, the disclosed subject matter includes a communications channel data filter for selectively modifying digitally encoded information transmitted from a source to a client destination over a communication path. A digital communication system includes a digital data channel such as a computer network or Internet with a data store containing detailed description data describing multiple referents at a first level of specificity. A first processor is connected to extract the detailed description data from the data store and to selectively obfuscate the detailed description data responsively to anonymity preference data respective to each of the multiple referents. The first processor is adapted to selectively obfuscate the detailed description data by suppressing elements of the vectors characterizing each subset of the multiple referents by forming a compatibility matrix whose edges represent the possible compatibilities of references in the obfuscated data and referents in the detailed description data and performing an optimization responsively to the compatibility matrix that pursues an objective function that minimizes the degree of obfuscation of the data that satisfies the respective anonymity preference data. The process is further adapted to transmit an optimized obfuscated data derived from the detailed description data to the client destination.

According to variations thereof, the tenth embodiments may be modified to form additional tenth embodiments in which first processor is adapted to receive at least a portion of the anonymity data from a second processor connected to the first processor by a network.

According to variations thereof, the tenth embodiments may be modified to form additional tenth embodiments in which first processor is adapted to share a portion of the optimization with the second processor, the first and second processors being connected by a network and otherwise physically separate, the allocation of the portions of the optimization being such that the detailed description data and obfuscated data pertaining to each referent are located on the same server and the optimization is performed using message-passing over the network between the processor and the first or second separate server.

According to variations thereof, the tenth embodiments may be modified to form additional tenth embodiments in which the first and second processors transmit their respective obfuscated data after optimization thereof to the client destination and other client destinations.

According to variations thereof, the tenth embodiments may be modified to form additional tenth embodiments in which optimization is such that the number of groups of indistinguishable referents in the obfuscated data is higher than in the detailed description data and the size of the groups varies according to the anonymity preference data.

According to variations thereof, the tenth embodiments may be modified to form additional tenth embodiments in which the first and second processors are network servers.

According to variations thereof, the tenth embodiments may be modified to form additional tenth embodiments in which the referents are persons and the detailed description data include personal data including relationships among the persons.

According to variations thereof, the tenth embodiments may be modified to form additional tenth embodiments in which the referents are persons and the vectors include purchase history.

According to variations thereof, the tenth embodiments may be modified to form additional tenth embodiments in which the referents are persons and the detailed description data include personal data including purchase history and relationships among the persons.

According to variations thereof, the tenth embodiments may be modified to form additional tenth embodiments in which the client destination is a database supporting a social media web site.

According to variations thereof, the tenth embodiments may be modified to form additional tenth embodiments in which the first processor is adapted to receive the anonymity preference data over a network from multiple remote stations connected over a network.

According to variations thereof, the tenth embodiments may be modified to form additional tenth embodiments in which the optimization includes: generating a compatibility graph with edges, each edge connecting a vector of the detailed description data to N other vectors, where N is greater than or equal to an anonymity parameter of the anonymity preference data respective to the referent corresponding to the each vector, a weight value being applied to each edge connecting incompatible input data sequences and performing a b-matching on the compatibility graph to calculate a minimum number of vector elements to suppress in order to satisfy constraints in the privacy preference data.

The following supplementary material includes all necessary detailed proofs and a worst-case analysis.

Proof of Theorem 1

Proof 1

In the first iteration, the algorithm is clearly solving $\hat{G}=\arg\min_{G \in G_b} h(G)$. Let $G^*=\arg\min_{G \in G_b} s(G)$ Clearly, the number of stars is less than the Hamming distance $s(G) \leq h(G)$ for any G. Since $\hat{G}$ is the minimizer of $h(G)$, we have $h(\hat{G}) \leq h(G^*)$. Furthermore, it is easy to show for $\delta$-regular graphs that $h(G) \leq c\delta s(G)$. Combining yields $s(\hat{G}) \leq h(\hat{G}) \leq h(G^*) \leq \delta s(G^*) = \delta \min_{G \in G_b} s(G)$.

Proof of Theorem 2

Proof 2

Create an $\epsilon$-approximation $\tilde{s}(G)$ to $s(G)$ by adding a tiny $\epsilon > 0$ to each term in the product $$\tilde{s}(G) = nd - \exp\ln \sum_{ik} \frac{W_{ik}}{W_{ik}} \prod_j (1 + \varepsilon - G_{ij}(X_{ik} \neq X_{jk})) \leq$$
$$nd - e^{\sum_{ijk} W_{ik}(G_{ij}(X_{ik} \neq X_{jk}) \ln \frac{\varepsilon}{1+\varepsilon} + \ln(1+\varepsilon)) - \Sigma_{ik} W_{ik} \ln W_{ik}}$$

where we introduced a variational parameter $W \in Z^{n \times d}$ s.t. $\Sigma_{ik} W_{ik} = 1$ and applied Jensen's inequality. The first step of the "while" loop minimizes the right hand side over G while the second minimizes over W (modulo a harmless scaling). Thus, the algorithm minimizes a variational upper bound on $\tilde{s}(G)$ which cannot increase. Since the parameter G is discrete, $\tilde{s}(G)$ must decrease with every iteration or else the algorithm terminates (converges).

Proof of Lemma 4.2

Proof 3

Take some perfect matching $M_1$ in G(A,B) (it exists because of Hall's theorem). If it uses e then we are done. Assume it does not. Delete all edges from $M_1$ from G(A,B) to obtain a $(\delta-1)$-bipartite graph. Take one of its perfect matchings, say $M_2$. If it uses e then we are done. Otherwise delete edges from $M_2$ and continue. At some point, some perfect matching will use e because, otherwise, we end up with an empty graph (i.e. without edges).

Proof of Lemma 4.4

Proof 4 Denote by $\check{G}=G(\hat{A}, \hat{B})$ the graph obtained from G(A,B) by deleting vertices of M. Obviously it has a perfect matching, namely: M–C. In fact $\check{G}$ is a union of complete bipartite graphs, pairwise disjoint, each with color classes of size at least $(\delta-c)$. Each perfect matching in $\check{G}$ is a union of perfect matchings of those complete bipartite graphs. Denote by $\check{G}_v$ a complete bipartite graph of $\check{G}$ corresponding to vertex v. Then obviously for every edge e in $\check{G}_v$ there is a perfect matching in $\check{G}_v$ that uses e. In $\check{G}_v$ we have at least $(\delta-c)$ edges adjacent to v and that completes the proof.

Proof of Theorem 4.1

Proof 5

Take perfect matching M and $C \subseteq M$ from the statement of the theorem. For every vertex $v \in A$, denote by $m(v)$ its neighbor in M. Denote: $m(V)=\{m(v): v \in V\}$. Take bipartite graph $\check{G}=G(\check{A}, \check{B})$ with color classes $\check{A}$, $\check{B}$, obtained from G(A,B) by deleting all vertices of C. For a vertex $v \in \check{A}$ and an edge e adjacent to it in $\check{G}$ we will say that this edge is bad with respect to v if there is no perfect matching in G(A,B) that uses e and all edges from C. We will say that a vertex $v \in \check{A}$ is bad if there are at least $\phi(\delta)$ edges that are bad with respect to v. Denote by x the number of bad vertices and by X the set of all bad vertices. We just need to prove that $$x \leq \frac{2c^3\delta^2 n'\left(1+\frac{\phi(\delta)+\sqrt{\phi^2(\delta)-2c^2\delta}}{2c\delta}\right)}{\phi^3(\delta)\left(1+\sqrt{1-\frac{2c^2\delta}{\phi^2(\delta)}}\right)\left(1-\frac{c^2}{\phi(\delta)}\right)} + \frac{c\delta}{\phi(\delta)}.$$

Take some bad vertex v and some edge e which is bad with respect to it. Graph $\check{G}$ obviously has a perfect matching, namely: M–C. However from the definition of e, it does not have a perfect matching that uses e. So the graph $\check{G}^e=G(\check{A}^e, \check{B}^e)$ obtained from $\check{G}$ by deleting both endpoints of e does not have a perfect matching. But, according to Hall's theorem, that means that in $\check{G}^e$ there is a subset $S_v^e \subseteq \check{A}^e$ such that $|N(S_v^e)| \leq |S_v^e|$, where N(T) denotes the set of neighbors of the vertices from the set T. But in $\check{G}$ we have: $|N(S_v^e)| \geq |S_v^e|$. In fact we can say more: $m(S_v^e) \subseteq N(S_v^e)$ in $\check{G}$. Therefore it must be the case that an edge e touches a vertex from $m(S_v^e)$ and furthermore $N(S_v^e)=m(S_v^e)$ in $\check{G}$.

Whenever the set $S \subseteq \check{A}$ satisfies: $N(S)=m(S)$ in $\check{G}$ we say that it is closed. So for every edge e bad with respect to a vertex v there exists closed set $S_v^e$. Fix some bad vertex v and some set E of its bad edges with size $\phi(\delta)$. Denote $S_v^E = Y_{e \in E} S_v^e$. $S_v^E$ is closed as a sum of closed sets. We also have: $v \notin S_v^E$. Besides every edge from E touches some vertex from $m(S_v^E)$. We say that the set S is $\phi(\delta)$-bad with respect to a vertex $v \in \check{A}-S$ if it is closed and there are $\phi(\delta)$ bad edges with respect to v that touch S. So we conclude that $S_v^E$ is $\phi(\delta)$-bad with respect to v. Let $S_v^m$ be the minimal $\phi(\delta)$-bad set with respect to v.

Lemma 11.1

Let $v_1$, $v_2$ be two bad vertices. If $v_2 \in S_{v_1}^m$ then $S_{v_2}^m \subseteq S_{v_1}^m$ Proof 6

From the fact that $S_v^m$ is closed we know $\phi(\delta)$ bad edges adjacent to $v_2$ and touching $m(S_{v_2}^m)$ must also touch $m(S_{v_1}^m)$. So those $\phi(\delta)$ edges also touch $m(S_{v_2}^m$ I $S_{v_1}^m)$ Clearly the set $T=S_{v_2m}$I $S_{v_1}^m$ is closed as an intersection of two closed sets. So from what we know so far we can conclude that it is $\phi(\delta)$-bad with respect to $v_2$. So from the definition of $S_{v_2}^m$ we can conclude that $T=S_{v_2}^m$, so $S_{v_2}^m \subseteq S_{v_1}^m$ Lemma 11.2

Denote $P=\{S_v^m : v \in X\}$. It is a partially ordered set (or "poset") with the ordering induced by the inclusion relation. Then it does not have anti-chains of size larger than $$\frac{c\delta}{\phi(\delta)}.$$

Proof 7

Take some anti-chain $A=\{S_{v_1}^m, \ldots, S_{v_l}^m\}$ in P. From lemma 11.1 we know that the set $v_1, \ldots v_l$ does not intersect $R=S_{v_1}^m Y S_{v_2}^m \ldots Y S_{v_l}^m$. But R is closed as a sum of closed sets. Assume by contradiction that $$l > \frac{c\delta}{\phi(\delta)},$$

i.e. $\phi(\delta)l>c\delta$. Now consider the set $D=m(R)$. We will count the number of edges touching D in G(A,B). On the one hand from the fact that G(A,B) is $\delta$-regular we know that this number is exactly $l\delta$. On the other hand we have at least $\phi(\delta)l$ edges ($\phi(\delta)$ bad edges from every $v_i$:i=1, 2, ..., l) touching D. Besides from the fact that R is closed we know that there are at least $l\delta-c\delta$ edges such that each of them is adjacent to some vertex from R and from m(R) (for every vertex from R we have $\delta$ edges in G(A,B) adjacent to it and all but the edges adjacent to some vertices from C must touch D; altogether we have at most $c\delta$ edges such that each of them is adjacent to some vertex from C and some vertex from R). So summing all those edges we get more than $\delta l$ edges which is a contradiction.

Corollary 11.1

Using Dillworth's lemma about chains and anti-chains in posets and lemma 11.2, we see that the set $P=\{S_v^m : v \in X\}$ has a chain of length at least $$\frac{x\phi(\delta)}{c\delta}.$$

Now take an arbitrary chain of $P=\{S_v^m : v \in X\}$ of length at least $$\frac{x\phi(\delta)}{c\delta}.$$

Denote $L=\{S_{v_1}^m, \ldots, S_{v_d}^m\}$, where $S_{v_1}^m \subseteq S_{v_2}^m \subseteq \ldots \subseteq S_{v_d}^m$. So we have $$d \geq \frac{x\phi(\delta)}{c\delta}.$$

Denote: $X_i = S_{v_{i-1}}^m - S_{v_i}^m$ for $i=1, 2, \ldots, d-1$. Assume that $|X_i| \geq (\xi+1)$. Then $X_i$ contains at least $\xi$ vertices different than $v_i$. Call this set of vertices $C_i$. At least one vertex from $C_i$ must have at most $$\left(\frac{c\delta - \phi(\delta)}{\xi}\right)$$

edges adjacent to it and touching $m(S_{v_i}^m)$. Assume not and count the number of edges of $G(A,B)$ with one endpoint in $m(S_{v_i}^m)$. Then we have more than $$\xi \frac{c\delta - \phi(\delta)}{\xi}$$

such edges adjacent to vertices from $C_i$. Moreover, there are at least $\phi(\delta)$ bad edges adjacent to vertex $v_i$. Finally we have at least $\delta|S_{v_i}^m| - c\delta$ edges like that adjacent to vertices from $S_{v_i}^m$ (the analysis of this last expression is the same as in lemma 11.2). So altogether we have more than $\delta|S_{v_i}^m|$ which is impossible because $G(A,B)$ is $\delta$-regular. So we can conclude that if $|X_i| \geq (\xi+1)$ then $X_i$ contains vertex $x_i$ with at most $$\left(\frac{c\delta - \phi(\delta)}{\xi}\right)$$

edges adjacent to it and touching $m(S_{v_i}^m)$. So there are at least $$\delta - \frac{c\delta - \phi(\delta)}{\xi}$$

edges adjacent to $x_i$ with second endpoints in $B - m(S_{v_i}^m)$. But we also know that $x_i \in S_{v_{i+1}}^m$ and the set $S_{v_{i+1}}^m$ is closed. So at least $$\delta - \frac{c\delta - \phi(\delta)}{\xi} - c$$

edges adjacent to $x_i$ have second endpoints in $m(S_{v_{i+1}}^m - S_{v_i}^m) = m(X_i)$. But that means that $$|m(X_i)| \geq \delta - \frac{c\delta - \phi(\delta)}{\xi} - c,$$

so $$|X_i| \geq \delta - \frac{c\delta - \phi(\delta)}{\xi} - c.$$

So we can conclude that if $|X_i| \geq (\xi+1)$ then $$X_i \geq \delta - \frac{c\delta - \phi(\delta)}{\xi} - c.$$

Let's now analyze how many consecutive sets $X_i$ may satisfy $|X_i| \leq \xi$. Assume that sets $X_{i+1}, \ldots, X_{i+l}$ all have size at most $\xi$. Consider vertices $v_{i+1}, v_{i+2}, \ldots, v_{i+j}$ and the sets of bad edges $E(v_{i+j})$ related to $v_{i+j}$ and $S_{v_{i+j}}^m$ for $1 \leq j \leq l$. We have: $|E(v_{i+j})| \geq \phi(\delta)$. We will count the number of edges in $G(A,B)$ that touch $m(S_{v_i}^m)$. All edges from $E(v_{i+1})$ satisfy this condition. At least $E(v_{i+2}) - |X_i|$ from $E(v_{i+2})$ satisfy it, at least $E(v_{i+3}) - |X_i| - |X_{i+1}|$ edges from $E(v_{i+3})$, etc. So we have at least $l\phi(\delta) - \xi - 2\xi - \ldots - (l-1)\xi$ edges from $Y_{j=1}^l E(v_{i+j})$ satisfying this condition. Furthermore we have at least $\delta|S_{v_i}^m| - c\delta$ other edges satisfying it (with one endpoint in $S_{v_i}^m$). Because altogether we can't have more than $\delta|S_{v_i}^m|$ edges satisfying the condition, we must have: $l\phi(\delta) - \xi - 2\xi - \ldots - (l-1)\xi \leq c\delta$. Note that $\xi \geq c$. So we have in particular:

$$l\phi(\delta) - \frac{\xi l^2}{2} \leq \xi\delta.$$

Solving this quadratic equation we obtain:

$$l \leq \frac{\phi(\delta) - \sqrt{\phi^2(\delta) - 2\xi^2\delta}}{\xi}$$

or $$l \geq \frac{\phi(\delta) + \sqrt{\phi^2(\delta) - 2\xi^2\delta}}{\xi}.$$

Now assume that we have more than $$\frac{\phi(\delta) - \sqrt{\phi^2(\delta) - 2\xi^2\delta}}{\xi}$$

consecutive $X_i$ of size at most $\xi$. Then let $r$ be the smallest integer greater than $$\frac{\phi(\delta) - \sqrt{\phi^2(\delta) - 2\xi^2\delta}}{\xi}.$$

Take $r$ consecutive sets: $X_{i+1}, \ldots, X_{i+r}$. Then it's easy to check that the condition $$\phi(\delta) > \xi\sqrt{2\delta + \frac{1}{4}}$$

implies that we have: $\phi(\delta) - \sqrt{\phi^2(\delta) - 2\xi^2\delta} < \xi r < \phi(\delta) + \sqrt{\phi^2(\delta) - 2\xi^2\delta}$. But this is a contradiction according to what we have said so far. Therefore we must have: $l \leq l_0$, where $$l_0 = \frac{\phi(\delta) - \sqrt{\phi^2(\delta) - 2\xi^2\delta}}{\xi}.$$

But that means that in the set: $\{X_1, X_2, \ldots, X_{d-1}\}$ we have at least $$\frac{d-1}{l_0+1}$$

sets of size at least $$\delta - \frac{c\delta - \phi(\delta)}{\xi} - c.$$

Sets $X_i$ are pairwise disjoint and are taken from the set of size $n' = n - c$. Therefore we have:

$$\frac{d-1}{l_0+1}\left(\delta - \frac{c\delta - \phi(\delta)}{\xi} - c\right) \leq n'.$$

So we have:

$$d \leq \frac{n'(l_0+1)}{\delta - \frac{c\delta - \phi(\delta)}{\xi} - c} + 1.$$

But then using the inequality $$d \geq \frac{x\phi(\delta)}{c\delta}$$

and substituting in the expression for $l_0$ we complete the proof of the theorem.

Proof of Lemma 4.5
Proof 8
Take canonical matching $M = \{(a_1,b_1), \ldots, (a_n,b_n)\}$ of $G(A,B)$. Without loss of generality assume that the adversary knows the edges: $\{(a_1,b_1), \ldots, (a_c,b_c)\}$. Write $C = \{(a_1,b_1), \ldots, (a_c,b_c)\}$ and $m(a_i) = b_i$, for $i = 1, 2, \ldots, n$. Denote the degree of a vertex $a_i$ in $G(A,B)$ as $\delta_i$ for $i = 1, 2, \ldots, n$. Note that from our assumption about the bipartite graph we know that the degree of a vertex $b_i$ is also $\delta_i$ for $i = 1, 2, \ldots, n$. For a subset $S \subseteq A$ denote $m(S) = \{m(v) : v \in S\}$. Take vertex $v = a_i$ for $i > c$. An edge $e$ non-incident with edges from $C$, but incident with $v$ is a good edge if there exists a perfect matching in $G(A,B)$ that uses $e$ such that $C$ is its sub-matching. It suffices to prove that for any fixed $v = a_i$ for $i > c$ every edge $e$ non-incident with edges from $C$, but incident with $v$ is a good edge. Assume by contradiction that this is not the case. Denote by $\tilde{G}(A, B)$ the graph obtained from $G(A,B)$ by deleting edges of $C$. For a subset $S \subseteq A$ we will denote by $N(S)$ the set of neighbors of the vertices of $S$ in $\tilde{G}(A, B)$. Graph $\tilde{G}(A, B)$ obviously has a perfect matching (a sub-matching of the perfect matching of $G(A,B)$). Our assumption on $e$ lets us deduce that, if we exclude from $\tilde{G}(A, B)$ an edge $e$ together with its endpoints, then the graph obtained in such a way does not have a perfect matching. So, using Hall's theorem we can conclude that there exists $S_v^e \subseteq A$ such that $v \notin S_v^e$ and, furthermore, the following two statements hold: [$e$ is incident with some vertex from $m(S_v^e)$] and [$N(S_v^e) \subseteq m(S_v^e)$]

Without loss of generality write $S_v^e = \{a_{c+1}, \ldots, a_{c+l}\}$ for some $l > 0$. Write $\Delta = \sum_{i=1}^{l} \delta_{c+i}$. Consider a fixed vertex $a_{c+i}$ for $i = 1, \ldots, l$. Denote by $F_i$ the set of the vertices of $m(S_v^e)$ adjacent to it and by $G_i$ the set of the vertices from the set $\{b_1, \ldots, b_c\}$ adjacent to it. Denote by $D_i$ the set of the neighbors of $a_{c+i}$ in $G(A,B)$. Note first that $D_{c+i} = F_i Y G_i$ for $i = 1, \ldots, l$. Otherwise there would exist a vertex in $S_v^e$ adjacent to some vertex $x \notin m(S_v^e)$ of $\tilde{G}(A, B)$. But that contradicts the fact that $N(S_v^e) \subseteq m(S_v^e)$. For a vertex $b_j \in G_i$ we call a vertex $a_j$ a reverse of $b_j$ with respect to $i$. Note that by symmetry $(a_j, b_{c+i})$ is an edge of $G(A,B)$. For a given vertex $a_{c+i}$, for $i = 1, 2, \ldots l$ write $Rev_i = \{(a_j, b_{c+i} : b_j \in G_i\}$. Note that the sets $Rev_1, \ldots, Rev(l)$ are pairwise disjoint and besides $|Rev_1 Y \ldots Y Rev_l| = \sum_{i=1}^{l} |G_i|$. Therefore we can conclude that there are at least $\sum_{i=1}^{l} |G_i| + \sum_{i=1}^{l} |F_i|$ edges nonadjacent to $v$ and with one endpoint in the set $m(S_v^e)$. Thus, from the fact that $D_{c+i} = F_i Y G_i$ for $i = 1, 2, \ldots, l$, we can conclude that there are at least $\sum_{i=1}^{l} |D_{c+i}|$ edges nonadjacent to $v$ and with one endpoint in the set $m(S_v^e)$. Since an edge $e$ has also an endpoint in $m(S_v^e)$, we can conclude that altogether there are at least $\Delta + 1$ edges in $G(A,B)$ with one endpoint in the set $m(S_v^e)$. But this completes the proof since it contradicts the definition of $\Delta$.

A worst-case type analysis for the asymmetric regular graph setting is now discussed in greater detail.

One can ask whether it is possible to prove some reasonable k-anonymity in the asymmetric case (the general $\delta$-regular asymmetric bipartite graphs) for every person, rather than the all-but-at-most guarantee of theorem 4.1? The answer is—no. In fact we can claim more. For every $\delta$ there exist $\delta$-regular bipartite graphs $G(A,B)$ with the following property: there exists an edge $e$ of some perfect matching M in $G(A,B)$ and a vertex $w \in A$ nonadjacent to $e$ such that in every perfect matching M' in $G(A,B)$ that uses $e$, vertex $w$ is adjacent to an edge from M.

So, in other words, it is possible that if the adversary is lucky and knows in advance a complete record of one person then he will reveal with probability 1 a complete record of some other person. Thus, those types of persons do not have much privacy. Fortunately, theorem 4.1 says that if the publisher chooses the parameters of a $\delta$-regular bipartite graph he creates carefully then there will only be a tiny fraction of persons like that. We next show constructions of asymmetric $\delta$-regular bipartite graphs for which the adversary, if given information about one specific edge of the matching in advance, can find another edge of the matching with probability 1.

For a fixed $\delta$ our constructed graph $G(A,B)$ will consist of color classes of sizes $\delta^2 + 1$ each. The graph $G(A,B)$ is the union of $\delta + 2$ bipartite subgraphs and some extra edges added between these graphs. The subgraphs are:

subgraphs $F_i$: i=1, 2, . . . , ($\delta$−1), where each $F_i$ is a complete bipartite graph with one color class of size $\delta$ (the one from A) and one color class of size ($\delta$−1) (the one from B). We denote the set of vertices of $F_i$ from A as $\{u_1^i, \ldots, u_\delta^i\}$ and from B as $\{d_1^i, \ldots, d_{\delta-1}^i\}$ bipartite subgraph $B_1$ of two adjacent vertices: x∈A, y∈B bipartite subgraph $B_2$ with vertex z∈A and k vertices from B adjacent to it, namely $\{r_0, r_1, \ldots, r_{\delta-1}\}$ complete ($\delta$−1)-regular bipartite subgraph $B_3$ with color classes $\{w_1, \ldots, w_{\delta-1}\} \subseteq A$ and $\{v_1, \ldots, v_{\delta-1}\} \subseteq B$ with edges between the above $\delta$+2 subgraphs as follows:

(y, $u_1^i$) for i=1, 2, . . . , $\delta$−1

($r_{\delta-i}$, $u_j^i$) for i=1, 2, . . . , ($\delta$−1); j=2, 3, . . . , $\delta$ (x, $v_i$) for i=1, 2, . . . , $\delta$−1

($r_0$, $w_i$) for i=1, 2, . . . , $\delta$−1.

Consider when an adversary attacks the above constructed graph G(A,B) after knowing one edge in advance. It is enough to prove that any matching in G(A,B) that uses (x,y) must also use (z, $r_0$). So assume by contradiction that there is a matching M in G(A,B) that uses both (x,y) and (z,$r_{\delta-i}$) for some i∈{1, 2, . . . , $\delta$−1}. Denote by 'G(A,B) the graph obtained from G(A,B) by deleting x, y, z, $r_{\delta-i}$. This graph must have a perfect matching. However it does not satisfy Hall's condition. The condition is not satisfied by the set $\{u_1^i, \ldots, u_\delta^i\}$ because one can easily check that in 'G(A,B) we have: $N(\{u_1^i, \ldots, u_\delta^i\})$=, . . . , $\{d_1^i, \ldots, d_{\delta-1}^i\}$. That completes the proof.

Note that in any of the foregoing embodiments, the vectors that characterize referents can be altered such that elements are translated from the private data into classes such that the masking or non-masking is effective to generalize the original data rather than simply suppress it. Referring to FIG. 7A, an approach is illustrated by an example of six persons whose ages and sexes are recorded in a private database portion 702. In this case it is desired for generalizations of the ages to be selectable for suppression in generating a released database. The original vectors are modified to group age ranges thereby resulting in database portion 704, which has the original age values plus age ranges (H=high, M=medium, L-low). In the anonymization process, the values are masked or not in the suppression process as described to produce the released database portion illustrated at 706. In the example of FIG. 7B, the age values are replaced by generalizations, which may include masking, by the anonymization process to produce a released database portion illustrated at 712. In any of the embodiments, the masking of vector elements may include generalizing vector elements in steps rather than complete masking.

In accordance with an embodiment, algorithms 1 and 2 can facilitate generalizing vector elements by "growing" or modifying each data set that corresponds to each user to include different representations of the same information. For example, rather than having a user with their age represented as an integer (e.g., "38"), columns can be added to the database (e.g., "between 0-25 years old," "between 26-50 years old," and "over 51 years old"), where some of the columns can even be partially redundant (e.g., "minor/adult"). Each of the values can be a different integer, but can be different representations of the same information (e.g., "Bob: 38, 0, 1, 0, 1," where the first 0 maps to "FALSE," the second 1 maps to "TRUE," the third 0 maps to "FALSE," and the fourth 1 maps to "ADULT"). Algorithms 1 and 2 can then be applied to the data set elements. Algorithms 1 and 2 simply require, a priori, a breakdown of the generalizations or categories of generalizations. This breakdown can either be discovered automatically, or determined manually by, for example, a database engineer who defines the data set.

Figure 7C:
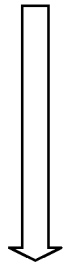

In the example of FIG. 7C, the data values in database portion 722 are supplemented with more general data which represent categories or, in this case, ranges, and specifically in this example, age ranges. Note that the categories or range values are redundant in this example, they demonstrate that the direct masking as shown at 724 can be used to convert from a specified age and a generalized age. In any of the embodiments, the masking of vector elements may include generalizing vector elements in steps rather than complete masking. The example of FIG. 7C can be generalized to any other kind of data, for example, geography: address, zip code, demographic category, etc.

Note that all of the descriptions of databases are applicable to streaming data with caching, the particular form of the data is not narrowly defined by the use of the term database. Thus, vectors need not be the same lengths, data need not be stored in the form typical of databases, although embodiments may be formed by restricting to such conventions.

Embodiments of the method, apparatus, system, computer program product and computer readable medium for providing adaptive anonymity via b-matching may be implemented on one or more general-purpose computers, one or more special-purpose computers, a programmed microprocessor or microcontroller and peripheral integrated circuit element, an ASIC or other integrated circuit, a digital signal processor, a hardwired electronic or logic circuit such as a discrete element circuit, a programmed logic device, such as a programmable logic device ("PLD"), programmable logic array ("PLA"), FPGA, programmable array logic ("PAL"), or the like. In general, any process capable of implementing the functions or processed described herein can be used to implement embodiments of the method, apparatus, system, computer program product, or computer readable medium for providing adaptive anonymity via b-matching.

Furthermore, embodiments, of the disclosed the method, apparatus, system, computer program product and computer readable medium for providing adaptive anonymity via b-matching may be readily implemented, fully or partially, in software using, for example, object or object-oriented software development environments that provide portable source code that can be used on a variety of one or more computer platforms. Alternatively, embodiments of the disclosed method for providing adaptive anonymity via b-matching can be implemented partially or fully in hardware using, for example, standard logic circuits or a very-large-scale integration ("VLSI") design. Other hardware or software can be used to implement embodiment depending on the speed and/or efficiency requirements of the system, the particular function, and/or a particular software or hardware system, microprocessor, or one or more computer systems being utilized. Embodiments of the method, apparatus, system, computer program product (or computer-readable medium) for providing adaptive anonymity via b-matching can be implemented in hardware and/or software using any known or later developed systems or structures, devices and/or software by those of ordinary skill in the applicable art from the functional description provided herein and with a general basic knowledge of the one or more computer arts.

Moreover, embodiments of the disclosed method for providing adaptive anonymity via b-matching can be implemented in software stored on a computer readable medium, a plurality of computer readable media, or one or more computer program products, and adapted to be executed on a programmed general-purpose computer, a special-purpose computer, a microprocessor, or the like. Also, the optimization method can be implemented as a program embedded on a personal computer (or a plurality of personal computers), such as a JAVA® or common gateway interface ("CGI") script, as a resource residing on a server or graphics workstation, as a routine embedded in a dedicated processing system, or the like. The method, apparatus, and system can also be implemented by physically incorporating the method for providing adaptive anonymity via b-matching, into a software and/or hardware system, such as the hardware and software systems of a medical imaging system, a digital imaging system, or an image processing system.

Note that while many of the operations described herein are described in terms of mathematical functions and operations, such functions and operations can be approximated while still permitting the solutions of the respective problems to be achieved. For example, the exponential functions, multiplication functions, and/or logarithmic functions may have computational analogs or approximations that may be used to implement them. Thus, in using the mathematical terms in the above discussion it should be understood that the embodiments include those in which such approximations are used.

Note that in all embodiments where a system or component loads software or data from a storage device or computer readable medium, it will be understood that modifications of such embodiments are possible and considered within the embodiments of the disclosed subject matter. For example, data may be read from a stream provided by a remote data storage device operating according to any principle including volatile or nonvolatile memory. An "Internet drive," network attached storage, distributed storage, or any other suitable device may also be used.

It is, therefore, apparent that there is provided in accordance with the presently disclosed subject matter, a method, apparatus, system, a computer program product, and a computer readable medium with software for providing adaptive anonymity via b-matching. While this disclosed subject matter has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of the disclosed subject matter.

What is claimed is:

1. A data filtering method for a communication system connecting a source of private data about a plurality of referents with a user over a network, comprising:
    at at least one network server, receiving private data from first multiple remote stations connected over a network, the private data including vectors, each vector characterizing a referent of the plurality of the referents, the referents including objects, events, or persons;
    at the at least one network server:
        determining privacy requirement data corresponding to subsets of the plurality of the referents;
        transforming the private data to generate released data, the transforming including filtering that includes suppressing elements of vectors characterizing each subset of the referents according to the privacy requirement data respective thereto;
        the suppressing being such that a first count of groups of referents that are indistinguishable from each other in the released data is higher than a second count of groups of referents that are indistinguishable from each other in the private data and a size of the groups of referents varies according to the privacy requirement data; and
    from the at least one network server:
        transmitting data derived from the released data to one or more receivers,
        wherein the suppressing includes: generating a compatibility graph with edges, each edge connecting each vector to N other vectors, where N is greater than or equal to an anonymity parameter respective to the referent corresponding to each vector, a weight value being applied to each edge connecting incompatible input data sequences and performing a b-matching on the compatibility graph to calculate a minimum number of vector elements to suppress in order to satisfy constraints in the privacy requirements data.

2. The method of claim 1, wherein the referents are persons and the vectors include personal data further including relationships among the persons.

3. The method of claim 1, wherein the referents are persons and the vectors include purchase history.

4. The method of claim 1, wherein the transmitting includes publishing said data derived from the released data to a social media web page.

5. The method of claim 4, wherein the determining includes receiving the privacy requirement data over a network from the first multiple remote stations.

6. The method of claim 5, wherein the privacy requirement data each includes an integer that corresponds to a size of a respective one of said groups.

7. The method of claim 6, wherein the suppressing includes performing an optimization based on a graph representation of the private data.

8. An apparatus for anonymizing captured data that represents entities comprising users, events, or objects, upon storage or retrieval of the data, to limit a latent correlation in the stored or retrieved data, thereby maximizing a utility of the latent correlation, the apparatus comprising:
    an input/output processor configured to continuously receive from multiple locations captured data and anonymity data associated with the entities;
    a data storage processor configured to continuously update stored data that represents the entities on a computer-readable data storage in response to the continuously receiving of the input/output processor, wherein a database of the stored data is maintained;
    a processor configured to load and execute software instructions stored on a computer readable medium, the software instructions, when executed, cause the processor to perform calculating a correlation between two or more entities based on the stored data and transmitting correlation data representing the correlation to a location in response to the calculating, the calculating comprising:
    storing input data sequences which depend on the stored data, the input data sequences each including data values characterizing an entity and an anonymity parameter dependent from the anonymity data and respective to the same entity, each anonymity parameter including an integer value indicating an anonymity degree, the anonymity parameters varying among the input data sequences, the data values of each input data sequence being specified and unspecified, each input data sequence being compatible with other input sequences where corresponding specified data values are the same;

generating weight data sets, each including weight values;

generating a compatibility graph with edges, each connecting each input data sequence to N other input data sequences, where N is greater than or equal to the anonymity parameter respective to the each input data sequence, a weight value of a weight data set being applied to each edge connecting incompatible input data sequences;

calculating a minimum number of the data values of each input data sequence to convert to unspecified values such that each input data sequence is connected to a distinct input data sequence by an edge of the compatibility graph is compatible with the distinct input data sequence;

modifying at least one weight value of the weight data set;

repeating the generating the compatibility graph, the calculating the minimum number of suppressions, and the modifying the at least one weight value until a termination condition is reached;

generating an output data set, the output data set comprising one or more output data sequences, wherein an output data sequence comprises one or more output data values, and wherein the one or more output values are equal to the one or more input data values of the input data set;

suppressing one or more output data values of the one or more output data sequences of the output data set according to a minimum number of suppressions required by the compatibility graph; and outputting the output data set.

9. The apparatus of claim 8, wherein the processor is further configured to randomly shuffle the output data set according to a defined permutation.

10. The apparatus of claim 9, wherein the termination condition comprises the minimum number of suppressions required by the compatibility graph ceasing to decrease.

11. The apparatus of claim 10, wherein the modifying at least one weight value of the weight data set comprises increasing a weight value of the weight data set that is applied to an edge where the input data sequence is not compatible with a distinct input data sequence.

12. The apparatus of claim 11, wherein the calculating the minimum number of suppressions further comprises identifying and storing one or more input data values that are required to be suppressed so that the input data sequence that is connected to a distinct input data sequence by an edge of the compatibility graph is compatible with the distinct input data sequence.

13. A non-transitory computer-readable medium having instructions stored thereon that, when executed by a processor, cause the processor to perform operations, the operations comprising:

continuously receiving captured data and anonymity data associated with entities from multiple locations;

continuously updating stored data that represents the entities on a computer-readable data storage in response to the continuously receiving, wherein a database of the stored data is maintained;

in response to a request event, calculating a correlation between two or more entities based on the stored data; and transmitting correlation data representing the correlation to a location in response to the calculating;

the calculating comprising:

compiling an input data set from the stored data, the input data set comprising one or more discrete input data sequences and one or more anonymity parameters of the anonymity data, wherein an input data sequence comprises one or more data values associated with an entity, and an anonymity parameter comprises an integer value that represents a desired anonymity level, and wherein at least one anonymity parameter is distinct from at least one other anonymity parameter;

generating a weight data set, the weight data set comprising one or more weight data sequences, wherein a weight data sequence comprises one or more weight values;

generating a compatibility graph comprising one or more edges, wherein an edge connects an input data sequence of the input data set to one or more distinct input data sequences of the input data set, wherein the input data sequence is connected to a number of distinct input data sequences that is greater than or equal to the anonymity parameter associated with the input data sequence, wherein a weight value of the weight data set is applied to an edge where the input data sequence is not compatible with a distinct input data sequence;

calculating a minimum number of suppressions of input data values that are required so that the input data sequence that is connected to a distinct input data sequence by an edge of the compatibility graph is compatible with the distinct input data sequence;

modifying at least one weight value of the weight data set;

repeating the generating the compatibility graph, the calculating the minimum number of suppressions, and the modifying the at least one weight value until a termination condition is reached;

generating an output data set, the output data set comprising one or more output data sequences, wherein an output data sequence comprises one or more output data values, and wherein the one or more output values are equal to one or more input data values of the input data set;

suppressing one or more output data values of the one or more output data sequences of the output data set according to the minimum number of suppressions required by the compatibility graph; and outputting the output data set.

14. The non-transitory computer-readable medium of claim 13, the operations further comprising randomly shuffling the output data set according to a defined permutation.

15. The non-transitory computer-readable medium of claim 14, wherein the termination condition comprises the minimum number of suppressions required by the compatibility graph ceasing to decrease.

16. The non-transitory computer-readable medium of claim 15, wherein the modifying at least one weight value of the weight data set comprises increasing a weight value of the weight data set that is applied to an edge where the input data sequence is not compatible with a distinct input data sequence.

17. The non-transitory computer-readable medium of claim 16, wherein the calculating the minimum number of suppressions further comprises identifying and storing one or more input data values that are required to be suppressed so that the input data sequence that is connected to a distinct input data sequence by an edge of the compatibility graph is compatible with the distinct input data sequence.

* * * * *